United States Patent
Adams et al.

(10) Patent No.: US 8,537,789 B2
(45) Date of Patent: Sep. 17, 2013

(54) MOBILE AD-HOC NETWORK PROVIDING COMMUNICATION LATENCY REDUCTION FEATURES AND RELATED METHODS

(75) Inventors: Stanley Laytar Adams, Indian Harbor Beach, FL (US); Keith Andrew Olds, Melbourne, FL (US); Joseph Bibb Cain, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 942 days.

(21) Appl. No.: 12/125,149

(22) Filed: May 22, 2008

(65) Prior Publication Data
US 2009/0034446 A1 Feb. 5, 2009

Related U.S. Application Data

(63) Continuation-in-part of application No. 11/832,202, filed on Aug. 1, 2007, now Pat. No. 7,855,997.

(51) Int. Cl.
*H04B 7/212* (2006.01)

(52) U.S. Cl.
USPC ........... 370/337; 370/278; 370/280; 370/294; 370/331; 370/332; 370/333; 370/334; 370/338; 370/400; 370/370; 370/401; 370/422; 370/450

(58) Field of Classification Search
USPC ............... 370/468, 278, 280, 294, 331, 332, 370/333, 334, 338, 400, 401, 422; 455/450
See application file for complete search history.

(56) References Cited

U.S. PATENT DOCUMENTS

| | | | | |
|---|---|---|---|---|
| 4,754,450 A | * | 6/1988 | Lynk et al. | 370/280 |
| 5,039,986 A | | 8/1991 | Georgiou | 340/825.79 |
| 5,751,709 A | | 5/1998 | Rathnavelu | 370/395 |
| 5,914,934 A | | 6/1999 | Rathnavelu | 370/229 |
| 6,205,118 B1 | | 3/2001 | Rathnavelu | 370/229 |
| 6,317,436 B1 | | 11/2001 | Young et al. | |
| 6,470,086 B1 | | 10/2002 | Smith | 380/255 |
| 6,711,177 B1 | | 3/2004 | Young | 370/468 |
| 6,813,277 B2 | | 11/2004 | Edmon et al. | 370/442 |
| 6,958,986 B2 | | 10/2005 | Cain | 370/337 |
| 6,996,074 B2 | * | 2/2006 | Garcia-Luna-Aceves et al. | 370/278 |

(Continued)

FOREIGN PATENT DOCUMENTS

| | | |
|---|---|---|
| EP | 1109365 | 6/2001 |
| EP | 2020786 | 2/2009 |
| WO | 01/28170 | 4/2001 |

OTHER PUBLICATIONS

*Delay and Delay Jitter in the WIN-T High Capacity Waveform,* WIN-T Technical Memorandum, Harris Corporation, Jun. 24, 2004.

(Continued)

*Primary Examiner* — John Blanton
*Assistant Examiner* — Jay P Patel
(74) *Attorney, Agent, or Firm* — Allen, Dyer, Doppelt, Milbrath & Gilchrist, P.A.

(57) ABSTRACT

A MANET may include a plurality of MANET nodes each comprising a wireless transceiver and a controller cooperating therewith for establishing a wireless communication link with an adjacent MANET node based upon a time division multiple access (TDMA) implementation. The TDMA implementation may use a repeating scheduling of a plurality of temporally spaced-apart time slot units within a control epoch to thereby reduce a latency of communication.

15 Claims, 16 Drawing Sheets

(56) References Cited

U.S. PATENT DOCUMENTS

| | | |
|---|---|---|
| 7,085,290 B2 | 8/2006 | Cain et al. .................... 370/469 |
| 7,200,407 B1* | 4/2007 | Smith et al. ................ 455/452.2 |
| 7,266,104 B2 | 9/2007 | Belcea .......................... 370/338 |
| 7,269,159 B1* | 9/2007 | Lai .............................. 370/352 |
| 7,372,889 B2* | 5/2008 | Atarashi et al. .............. 375/130 |
| 7,508,802 B2* | 3/2009 | Koo .............................. 370/338 |
| 7,596,113 B1* | 9/2009 | Kingston et al. ............. 370/320 |
| 7,903,631 B2* | 3/2011 | Ross et al. .................... 370/349 |
| 8,023,885 B2* | 9/2011 | Proctor et al. .................... 455/7 |
| 2002/0080768 A1* | 6/2002 | Garcia-Luna-Aceves et al. .......................... 370/349 |
| 2002/0141435 A1* | 10/2002 | Newberg et al. ............. 370/442 |
| 2003/0108059 A1* | 6/2003 | Yew et al. .................... 370/443 |
| 2003/0214914 A1* | 11/2003 | Cain ............................. 370/252 |
| 2004/0028018 A1* | 2/2004 | Cain ............................. 370/338 |
| 2004/0109689 A1* | 6/2004 | Song et al. ..................... 398/69 |
| 2004/0152464 A1* | 8/2004 | Sugaya ....................... 455/435.1 |
| 2005/0285803 A1* | 12/2005 | Iacono et al. ................. 343/702 |
| 2006/0007890 A1* | 1/2006 | Yokoyama .................... 370/334 |
| 2006/0104248 A1* | 5/2006 | Koo .............................. 370/338 |
| 2006/0268931 A1* | 11/2006 | Sella ............................. 370/468 |
| 2007/0086484 A1* | 4/2007 | Quigley et al. ............... 370/468 |
| 2007/0101015 A1* | 5/2007 | Larsson et al. ............... 709/238 |
| 2008/0007454 A1* | 1/2008 | Minkoff ....................... 342/379 |
| 2008/0165797 A1* | 7/2008 | Aceves ........................ 370/458 |
| 2008/0310390 A1* | 12/2008 | Pun et al. ..................... 370/347 |
| 2009/0060081 A1* | 3/2009 | Zhang et al. ................. 375/267 |

OTHER PUBLICATIONS

*HNW* (*Highband Networking Waveform*), Harris Corporation, 2007.

* cited by examiner

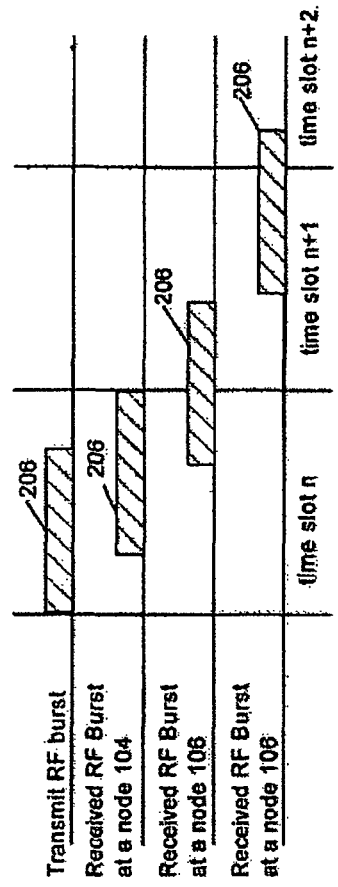
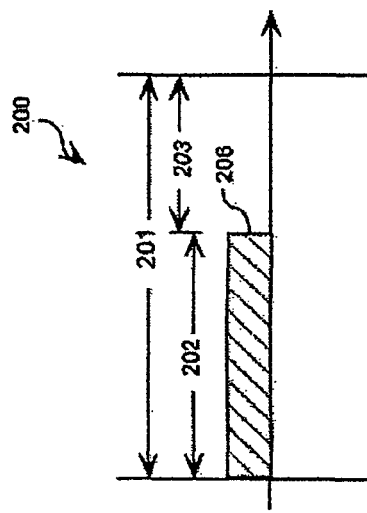
FIG. 3
(Prior Art)
FIG. 2
(Prior Art)

MOBILE AD-HOC NETWORK PROVIDING COMMUNICATION LATENCY REDUCTION FEATURES AND RELATED METHODS

CROSS-REFERENCE TO RELATED APPLICATIONS

This application is a continuation-in-part of Application Ser. No. 11/832,202, filed Aug. 1, 2007, now U.S. Pat. No. 7,855,997, the entire disclosure of which is hereby incorporated by reference herein.

FIELD OF THE INVENTION

The present invention relates to the field of wireless communications networks, and, more particularly, to mobile ad-hoc networks (MANETs) and related methods.

BACKGROUND OF THE INVENTION

Wireless networks have experienced increased development in the past decade. One of the most rapidly developing areas is mobile ad-hoc networks (MANETs). Physically, a MANET includes a number of geographically distributed, potentially mobile nodes sharing one or more common radio channels. Compared with other types of networks, such as cellular networks or satellite networks, the most distinctive feature of MANETs is the lack of any fixed infrastructure. The network is formed of mobile (and potentially stationary) nodes, and is created on the fly as the nodes communicate with each other. The network does not depend on a particular node and dynamically adjusts as some nodes join or others leave the network.

MANETs may use a variety of communications formats including Time Division Multiple Access (TDMA) arrangements. In TDMA-based MANET networks, nodes communicate during specified time periods or time slots. To coordinate such communications, each node includes a clock which is synchronized with a highly stable time reference. For example, this stable time reference may be derived from a satellite-based GPS signal. Typical TDMA systems, such as cellular systems, often rely on synchronization to base stations to establish system timing and to compensate for propagation delay differences. Such centralized TDMA cellular systems include, but are not limited to, global systems for mobile communications (GSM), Integrated Digital Enhanced Network (iDENs) systems, 802.16 based broadband wireless access network systems, and TDMA satellite communications (SATCOM) systems.

One particularly advantageous wireless communication network which provides enhanced time slot allocation and interference avoidance/mitigation features is disclosed in U.S. Pat. No. 6,958,986, which is assigned to the present Assignee Harris Corporation and is hereby incorporated herein in its entirety by reference. The network includes a plurality of mobile nodes each including a wireless transceiver and a controller for controlling the wireless transceiver. The controller is also used for scheduling a respective semi-permanent time slot to establish a communication link with neighboring mobile nodes for transmitting data therebetween, where the data has different priority levels. The controller may also determine respective link utilization metrics for each data priority level for each communication link, and schedule demand assigned time slots for establishing additional communication links with the neighboring mobile nodes for transmitting data therebetween based upon the link utilization metrics and data priority levels. The wireless communication network may also provide enhanced interference avoidance and/or mitigation features in certain embodiments.

TDMA nodes can be expected to have a significant total time base uncertainty. Also, propagation delay between nodes can create additional timing uncertainties that change in real time as the mobile nodes move relative to one another. To manage these timing uncertainties, centralized cellular TDMA systems use a base station infrastructure to create a hub and spoke topology. These base stations are usually, but not necessarily, fixed in location. The mobile nodes operate as "spokes" or "clients" to the base station hubs and synchronize their transmissions to those base stations. However, a MANET is an infrastructure-less network that uses peer-to-peer control mechanisms, and therefore does not have base stations to provide a central timing reference.

In a TDMA MANET, an REF burst is usually transmitted within a time slot as close to the beginning of the time slot as possible. The time slot length may be selected to exceed the maximum RE burst length by an amount of time referred to as the "guard time." A wireless TDNA system such as a MANET includes a controller that allocates these timeslots to different links based on criteria such as traffic demand and interference avoidance, thus sharing the available system bandwidth between links on a time shared basis.

Conventional MANET networks using TDMA generally allocate the timeslots by forming an access schedule which determines which link is allocated to which timeslot. These schedules are generally defined over some fixed interval often referred to as a TDMA epoch. A particular link may be granted one or more timeslots during an epoch.

When a traffic packet is available for transmission on a link, it waits until the timeslot assigned to that link before it can be transmitted. This time spent waiting for a timeslot is called "framing delay" and represents a large part of the transport latency encountered by a data packet as it transits in a TDMA MANET. In the case of a single timeslot assigned to a link per epoch, this wait time is half the epoch length on average and may be as long as the epoch on every hop through the network. Therefore, the length of a TDMA epoch largely determines the transit latency through the network.

To address this problem, some existing TDMA wireless systems have used very short epochs with only a few timeslots or very short timeslots or both. However, that approach limits the scalability of the network, increases the overhead of the network and increases the processing load of the TDMA controller. Other wireless TDMA systems allocate multiple slots to each link, which are distributed through the epoch. However if the time slots are distributed randomly that approach does not assure a lower delay and if they are distributed deterministically it is essentially the same thing as shortening the epoch.

It may therefore be desirable to provide a method for reliably reducing the framing delay of a wireless TDMA system, such as a TDMA MANET, for example, without requiring a shortened TDMA epoch.

SUMMARY OF THE INVENTION

In view of the foregoing background, it is therefore an object of the present invention to provide a mobile ad-hoc network (MANET) and related methods with communication latency reduction features and related methods.

This and other objects, features, and advantages are provided by a MANET which may include a plurality of MANET nodes each comprising a wireless transceiver and a controller cooperating therewith for establishing a wireless communication link with an adjacent MANET node based upon a time division multiple access (TDMA) implementation. More particularly, the TDMA implementation may use a repeating scheduling of a plurality of temporally spaced-apart time slot units within a control epoch to thereby reduce a latency of communication.

In addition, the TDMA implementation may use time slots and without using a range dependent guard time therein, and the controller may further determine a range to the adjacent MANET node and schedule time slots to offset a link delay in a received signal from the adjacent MANET node based upon the determined range. By way of example, the plurality of time slot units may be temporally equally spaced-apart within the control epoch. In some embodiments, the time slot unit may include a single time slot, or it may include a plurality of time slots (or "mini" time slots).

Each MANET node may further include an antenna coupled to the wireless transceiver. For example, the antenna may be a directional antenna, and the controller may establish a directional wireless communication link with the adjacent MANET node. Furthermore, the TDMA implementation may be a distributed TDMA implementation wherein time slot scheduling operations are shared between the MANET nodes. Also, the TDMA implementation may also be a variable-length time slot TDMA implementation. The controller may further cooperate with at least one neighboring MANET node when scheduling time slots to reduce a likelihood of interference therewith.

A mobile ad-hoc network (MANET) communications method for a plurality of MANET nodes is also provided. The method may include establishing a wireless communication link between a pair of adjacent MANET nodes based upon a time division multiple access (TDMA) implementation. Moreover, the TDMA implementation may use a repeating scheduling of a plurality of temporally spaced-apart time slot units within a control epoch to thereby reduce a latency of communication.

BRIEF DESCRIPTION OF THE DRAWINGS

FIG. 2 is a timing diagram that is useful for understanding timing problems which occur in mobile ad-hoc networks.

FIG. 3 is a timing diagram that is useful for understanding timing problems which occur in mobile ad-hoc networks.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
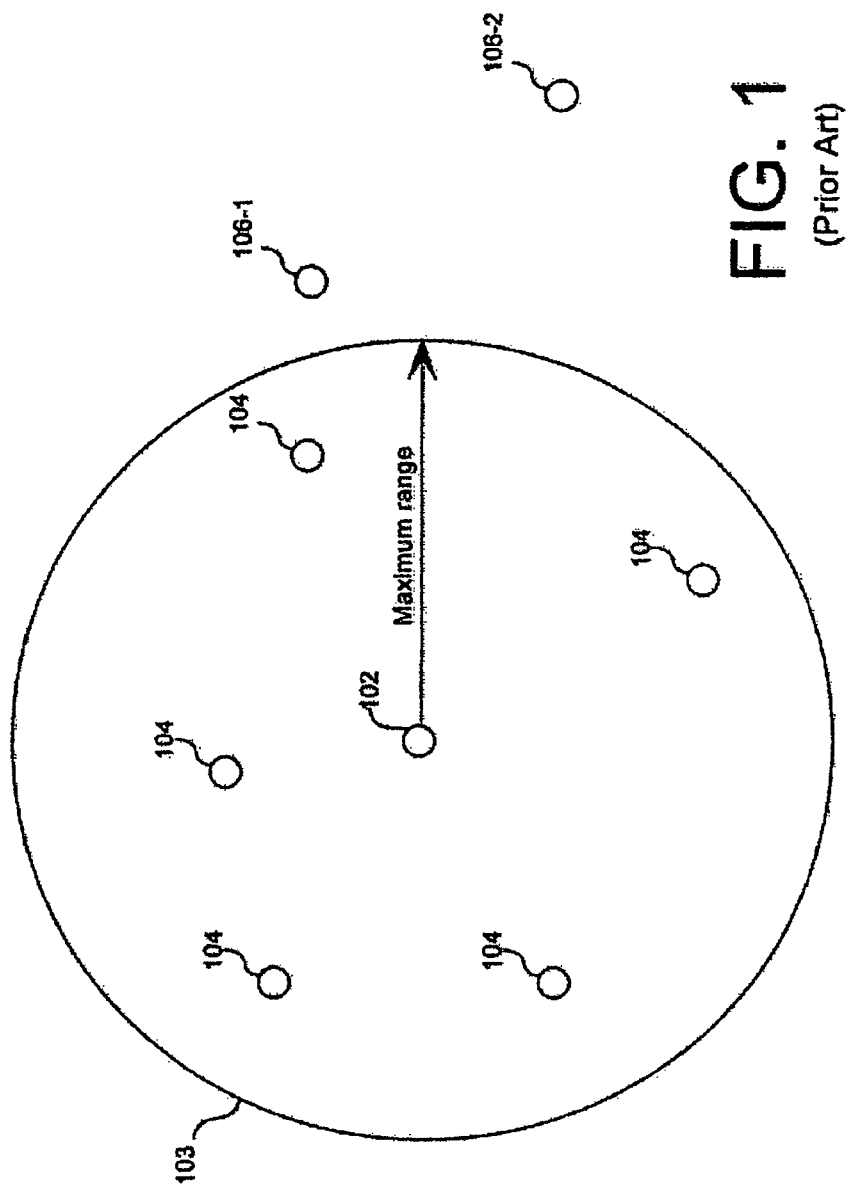
FIG. 1 is a drawing that is useful for understanding timing problems which occur in mobile ad-hoc networks.

Conventional approaches to peer-to-peer, ad-hoc TDMA communication networks are based on knowing only the maximum range between nodes. This concept is illustrated in FIGS. 1-3. FIG. 1 shows a two-dimensional layout of a group of nodes in a prior art TDMA based mobile ad-hoc network (MANET). In FIG. 1, the transmitting node is node 102. In this example, the system has a guard time that is designed to accommodate a maximum range indicated by the radius of the circle 103. Nodes 104 are within this radius. Node 106-1 is outside this radius. Node 106-2 is further outside the radius as compared to node 106-1.

Referring now to FIG. 2 there is shown a conventional time slot 200. The time slot has a duration 201, a maximum RF burst time 202, and a guard time 203. The guard time is provided to accommodate range uncertainty as well as other timing uncertainties at the receiver and transmitter. An RF burst 206 is shown within the maximum burst time 202. Referring again to FIG. 1, it will be understood that transmissions from node 102 to node 106-1 or 106-2, which are of the maximum RF burst length, will contaminate the following (or later) time slot for node 106-1, 106-2 because these nodes are each located beyond the radius of the maximum range circle 103.

An alternative illustration of the foregoing concept is provided in FIG. 3. The transmit RF burst 206 of maximum length is shown in time slot n. At a node 104 the RF burst 206 arrives within slot n because node 104 is within the maximum guard time protected range. When REF burst 206 is received at a node 106-1 (beyond maximum protected range) the transmission will cause interference for node 106-1 in time slot n+1. At a more distant node 106-2, the transmission will cause interference in time slot node n+2. As will be appreciated by those skilled in the art, transmitted RF bursts 206 that are not of maximum length may or may not contaminate the following time slot(s).

In FIGS. 1-3, the length of the guard period 203 can be defined so that it comprises a greater portion of the total time 201 comprising time slot 200. Increasing the length of time of the guard period in this way can allow more distant nodes, such as nodes 106-1, 106-2 to receive the RF burst 206 within the guard period for a time slot n. Thus, if it is known that the network must cover a larger area, a longer guard period can be selected. However, it will be appreciated that increasing the guard period in this way will decrease the time available for the RF burst 206. This has the undesirable effect of reducing efficiency.

In the conventional TDMA MANET illustrated in FIGS. 1-3, the choice of which timeslots are assigned to which link is made using a "roundrobin" or other timesharing method known in the art. Typically a particular link receives one opportunity to access the radio resources and media each TDMA epoch. This has the undesirable effect of increasing the latency of the system.

The invention will now be described more fully hereinafter with reference to accompanying drawing FIGS. 4-15, in which illustrative embodiments of the invention are shown. This invention, may however, be embodied in many different forms and should not be construed as limited to the embodiments set forth herein.

In order to alleviate the deficiencies of the prior art, an embodiment of the invention includes a peer-to-peer TDMA type mobile ad-hoc network including a plurality of individual nodes. The individual nodes communicate with each other within an ad-hoc network environment. Significantly, information concerning the range between node pairs is estimated and exploited. Consequently, the scalability, latency, and efficiency of the TDMA communication system can be significantly enhanced.

The inventive arrangements advantageously include a distributed long range scheduler function as part of each node. The distributed long range scheduler determines specific times when node pairs can communicate to avoid interfering with one another. Heuristics produce an efficient distributed schedule for communication between node pairs. This schedule is advantageously based on information which includes both node range and angle (i.e., direction). Accurate time references are provided at each node and nodes exchange position estimates so that each node can maintain an estimate of range to its various neighbors.

Further, unlike conventional arrangements which provide a time axis measured in fixed time slots per epoch, the inventive arrangements may make use of a plurality of mini-slots. A plurality of mini-slots can be arbitrarily selected to define a time slot which is thereafter used for communications from one node to another node. The time slot may be independently evaluated by each node to determine whether its use will cause interference with neighboring nodes. Each node independently may adjust its schedule to account for the link delay. Further, transmit and receive time slots may be scheduled separately to allow for more efficient use of available time.

Figure 4:
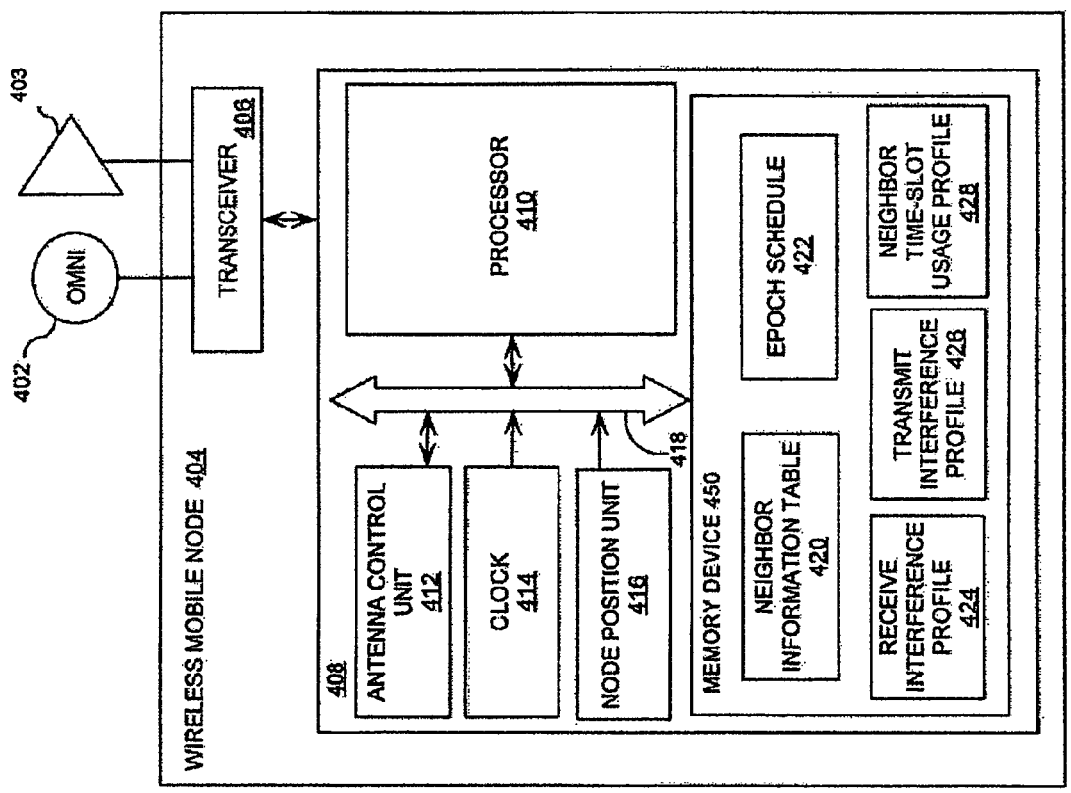
FIG. 4 is a block diagram of a wireless mobile node that can be used to implement the present invention.

Referring now to FIG. 4, there is provided a simplified block diagram for a wireless mobile node 404 that is useful for understanding the present invention. The wireless mobile node can be used in a wireless communication network as described herein. The wireless mobile node 404 illustratively includes a directional antenna 403, a transceiver 406, and a control unit 408. The wireless mobile node 404 can optionally include an omni-directional antenna 402.

The transceiver 406, the omni-directional antenna 402 and the phased array antenna 404 collectively enable wireless communications between the wireless mobile node 404 and a plurality of other nodes having a similar configuration in the MANET. In this regard, it should be appreciated that the omni-directional antenna 402 is configured to send and/or receive signals in any direction. The directional antenna 403 is configured to selectively send and/or receive signals in a desired direction. The directional antenna 403 can include, but is not limited to, a phased array antenna. The omni-directional antenna 402 and directional antenna 403 are coupled to the transceiver 406 so that RF signals can be communicated to and from each of these antennas. In an alternative embodiment, the omni-directional antenna can be omitted and omni-directional communications can be provided by scanning a directional antenna beam through a wide range of azimuth and elevation angles.

The transceiver 406 can include conventional REF circuitry (not shown) and a modem (not shown) for receiving and transmitting RF signals. The transceiver 406 is electrically connected to the control unit 408 so that received signals demodulated by the transceiver 406 can be communicated to the control unit. Similarly, baseband digital data and control signals can be communicated from the control unit 408 to the transceiver 406.

The control unit 408 illustratively includes a processor 410, antenna control unit 412, clock 414, and node position unit 416. The antenna control unit 412 can control a direction of an antenna beam associated with the directional antenna 403. The antenna control unit 412 can optionally be included as part of the transceiver 406. Clock 414 provides a highly accurate and stable time reference for each node. The accuracy of the clock 414 can be maintained by various timing approaches. For example, a GPS timing signal can be used for this purpose. As will be appreciated by those skilled in the art, GPS timing signals can provide a highly accurate time reference. Thus, clock 414 can be synchronized with clocks of other wireless mobile nodes forming part of the network described herein. The clocks are preferably synchronized to within a fractional portion of a mini time-slot (described below in greater detail). According to one embodiment, the time references can advantageously be selected so that a clock 414 associated with each node 404 is synchronized to within 100 nanoseconds of other nodes in the network. Still, the invention is not limited in this regard.

The control unit 408 also illustratively includes a node position unit. The node position unit is configured to allow the node to identify its position. For example, the node position unit can advantageously include a GPS receiver and GPS processing circuitry suitable for allowing the node 404 to precisely locate its position at any terrestrial or airborne location. If a GPS receiver is used, the GPS timing data can be used as described above to aid in synchronizing the clocks 414 in each of the nodes 404.

The control unit 408 also includes a memory device 450. The memory device 450 stores several different types of information. For example, the memory device 450 includes a neighbor information table 420, epoch schedule 422, a receive (Rx) interference profile 424, a transmit (Tx) interference profile 426, and a neighbor time-slot usage profile 428. The various types of information stored in memory device 450 will be discussed below in greater detail. The various components forming the control unit 408 can communicate with each other by a suitable data bus 418.

Those skilled in the art will appreciate that the architecture described herein for wireless mobile node 404 is one possible example of a wireless mobile node which can be used with the present invention. However, it should be understood that the invention is not limited in this regard. Instead, any other suitable wireless mobile node architecture can also be used without limitation.

An overview of the basic operation of wireless mobile network utilizing a plurality of wireless mobile nodes 404 according to the inventive arrangements will now be provided. According to an embodiment of the invention, individual network nodes 404 use a neighbor discovery process. The neighbor discovery process includes an exchange of position information so that each node has the coordinates of neighboring nodes. This position information allows the range information and relative direction of such neighbor nodes to be calculated. Range information and direction information is used for purposes of performing interference calculations. Interference calculations also include consideration of propagation delays between nodes and required antenna beam pointing directions based on the known node locations. Interference calculations may also utilize time slot allocations at other nodes, both transmit and receive, as well as the directions the transmit and receive antennas are pointing.

The present invention is unlike conventional MANET systems that utilize conventional TDMA technology. In such conventional TDMA systems, periods of time are divided into epochs, and communication between nodes occurs in time slots which are sub-portions of each epoch. Significantly, each time slot in a conventional system will have a fixed timing position in each epoch. Nodes in the ad-hoc network which need to communicate are assigned time slots for such communications. However, this fixed timing creates problems for long range communications.

The present invention also divides time into a series of epochs. However, the timing of the time slots used for communications between nodes is not fixed. Stated differently, it can be said that the timing position of each time slot is not fixed within each epoch. In the present invention, the position of time slots within each epoch can be arbitrarily selected by the nodes in accordance with an algorithm. The algorithm is selected for minimizing potential interference among neighbor nodes.

Figure 5:
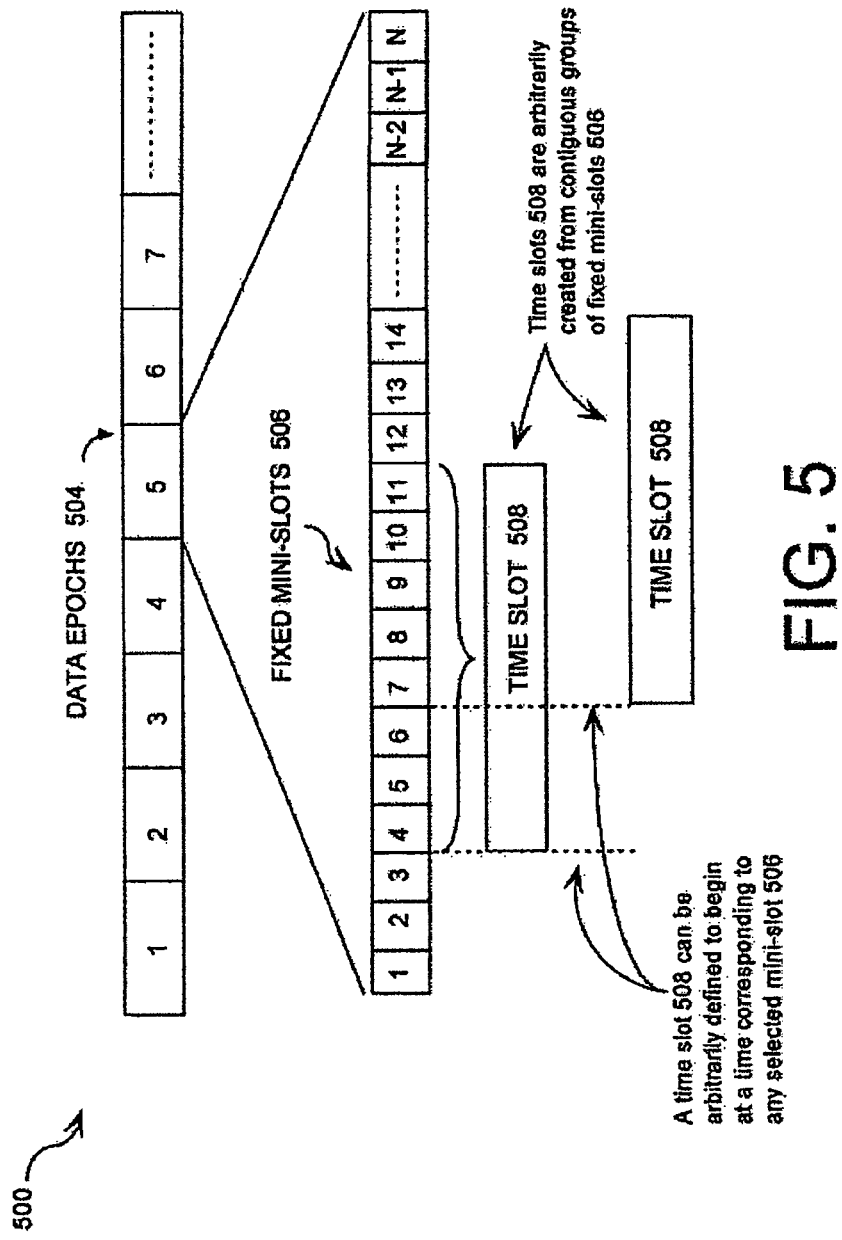
FIG. 5 is a timing diagram that is useful for understanding a timing relation between data epochs, mini-slots, and time slots.

In order to allow for time slots to have timing positions which are arbitrarily defined within an epoch, the present invention introduces the concept of mini-slots, which are combined to form a time slot. For example, any number of mini-slots can be combined to form a time slot. This concept can be better understood with reference to FIG. 5. In FIG. 5, there is shown a timing diagram 500 for a TDMA type mobile ad-hoc network according to the inventive arrangements. The timing diagram shows a series of data epochs 504 which are fixed divisions of time. Each epoch 504 is sub-divided into a plurality of N mini-slots 506. According to an embodiment of the invention, a time slot 508 can be comprised of contiguous groups of M mini-slots. For example, a typical time slot 508 can be comprised of 8 mini-slots 506 (M=8). Each time slot 508 can have an arbitrarily defined starting position (subject to interference calculations) that corresponds to a starting time of any selected mini-slot. Each time slot 508 can have different lengths by combining 1, 2, 3, 4, or more mini-slots.

Figure 6:
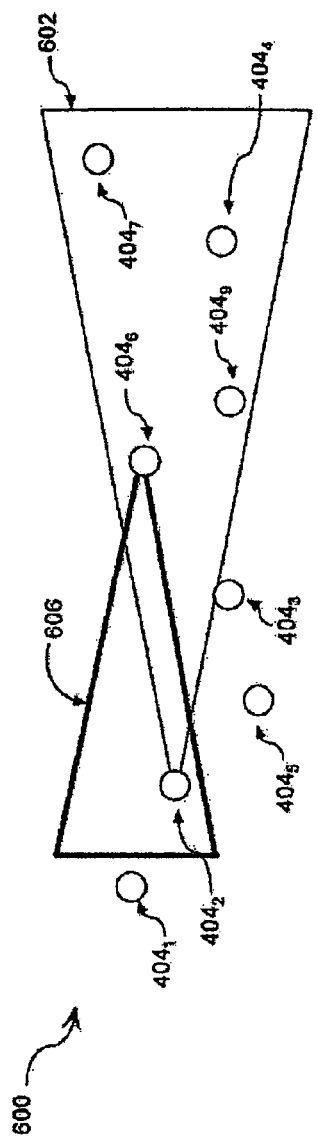
FIG. 6 is a drawing that shows a planar geometry of several nodes which is useful for understanding the invention.

In order to understand how time slot timing, range, direction and propagation information is used to mitigate interference, an example is useful. FIG. 6 shows a planar geometry of several nodes where node 4042 (the transmitting node) is attempting to schedule a transmit time slot consisting of five mini-slots (M=5) with node 4046 (the receiving node). In FIG. 6, the transmit beam pattern 602 is shown for node 2. Nodes 4044, 4046, 4047 and 4049 are located within range and in the beam pattern. A time slot scheduler can be used to automatically select a timing position for a transmit time slot that will minimize interference to neighboring nodes.

Figure 7:
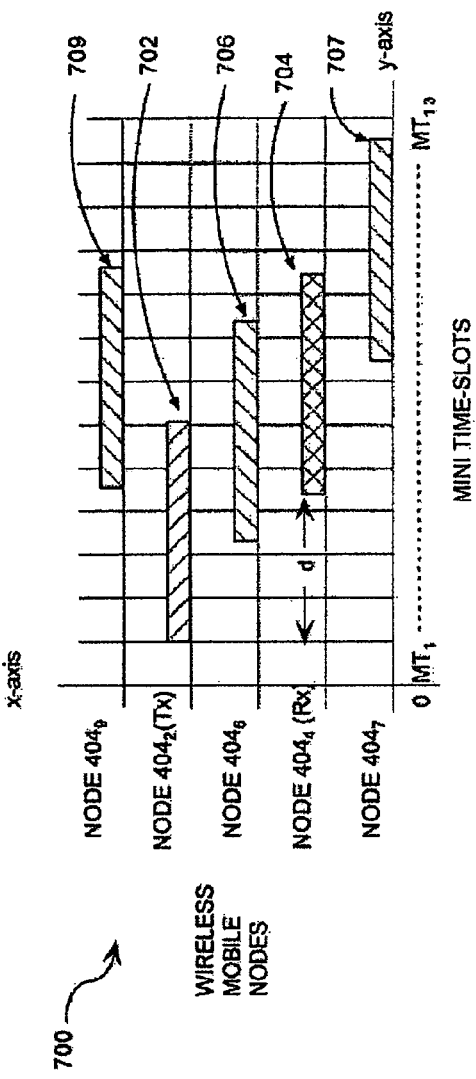
FIG. 7 is a timing diagram that is useful for understanding potential sources of interference in FIG. 6.

The scheduler process begins by selecting a candidate set of mini-slots which will define the position of the transmit time slot for node 4042. FIG. 7 is a timing diagram 700 which shows the time base at nodes 4042, 4044, 4046, 4047 and 4049. It is assumed that clocks 414 at the nodes 4041-4049 are synchronized to fractions of a mini-slot.

The timing diagram shows that a candidate set of mini-slots MT2-MT6 can be selected at node 4042 which define a possible timing position for time slot 702. In order to determine whether this timing position will cause interference with neighboring nodes, the timing position of time slot 702 is mapped to the corresponding time intervals at nodes 4044, 4046, 4047 and 4049. These corresponding time intervals 704, 706, 707, 709 are offset from time slot 702 because of the propagation delay "d" between the nodes. Propagation delay can be determined if the transmitting node 4042 knows the relative position of neighbor nodes 4046, 4047 and 4049. The corresponding time interval for the receiver node 4044, is 704. The corresponding time intervals mapped to the location of nodes 4046, 4047 and 4049 are respectively 706, 707, 709. Time intervals 706, 707, 709 represent the time intervals at nodes 4046, 4047 and 4049 during which the signal will arrive from node 4042 if transmitted during time slot 702.

It should be understood that during the time intervals 706, 707, 709, a transmitted signal from node 4042 will cause interference at nodes 4046, 4047 and 4049 if the antenna beams of these nodes are pointed in the direction of transmitting node 4042. For example, it can be observed that transmitting node 4042 can be within a receive antenna beam 606 of node 4046 during a transmit time interval. Notably, transmitting node 4042 can advantageously be provided with position and timing schedule for neighbor nodes to determine the direction in which its neighbor node antennas are pointing during each mini-slot. If transmitting node 4042 determines that any one of nodes 4046, 4047 and 4049 are in fact scheduled to receive signals (1) from a direction which coincides with transmitting node 4042, and (2) such signals are scheduled to be received during the intervals 706, 707, 709, then it can conclude that the transmissions from node 4042 during time slot 702 will cause interference. If transmitting node determines that interference will occur, then a different candidate time slot 702 is advantageously selected.

Figure 8:
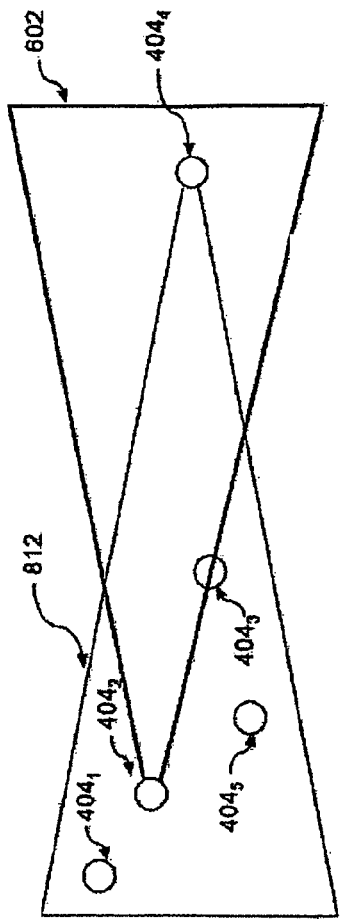
FIG. 8 is a drawing that shows the planar geometry of several nodes in FIG. 6 with different antenna pattern overlays.
Figure 9:
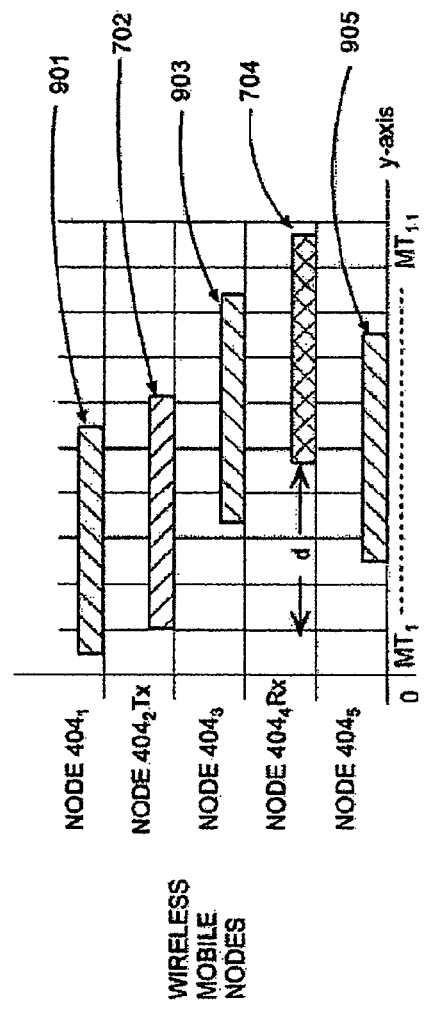
FIG. 9 is a timing diagram that is useful for understanding potential sources of interference in FIG. 8.

If node 4042 determines that time slot 702 will not cause interference to the receivers of nodes 4046, 4047 and 4049 then a second analysis can be performed. This second analysis can determine whether any nodes in the antenna beam of receiver node 4044 will be transmitting in the direction of node 4044 during the time interval corresponding to time slot 702 (as adjusted for propagation delay). This analysis is shown in FIGS. 8 and 9. FIG. 8 shows a planar geometry 800 which is similar to the one shown in FIG. 6. However, in FIG. 8, nodes 4046, 4047 and 4049 are omitted for greater clarity since they are not part of this analysis. It can be observed in FIG. 8 that nodes 4041, 4042, 4043 and 4045 are located within the range and in the receiver beam pattern 812 of node 4044.

FIG. 9 shows a timing diagram which includes segment of the time base at several nodes 4041-4045. It is assumed that clocks 414 at the nodes 4041-4044 are synchronized to fractions of a mini-slot. In FIG. 9, the timing position of time interval 704 is mapped to the corresponding time intervals at nodes 4041, 4043, and 4045. These corresponding time intervals 901, 903, 905 are offset from time slot 704 because of the propagation delay "d" between the nodes. FIG. 9 shows that node 4044 will experience interference during time interval 704 if nodes 4041, 4043, or 4045 transmit toward node 4044 during time periods 901, 903, or 905. If node 4044 has transmission schedules and position information for nodes 4041, 4043, or 4045 then it can determine whether time interval 704 is an acceptable receive time for node 4044. In the same way, node 4044 can determine whether time interval 702 is an acceptable transmit time slot for node 4042.

Figure 10:
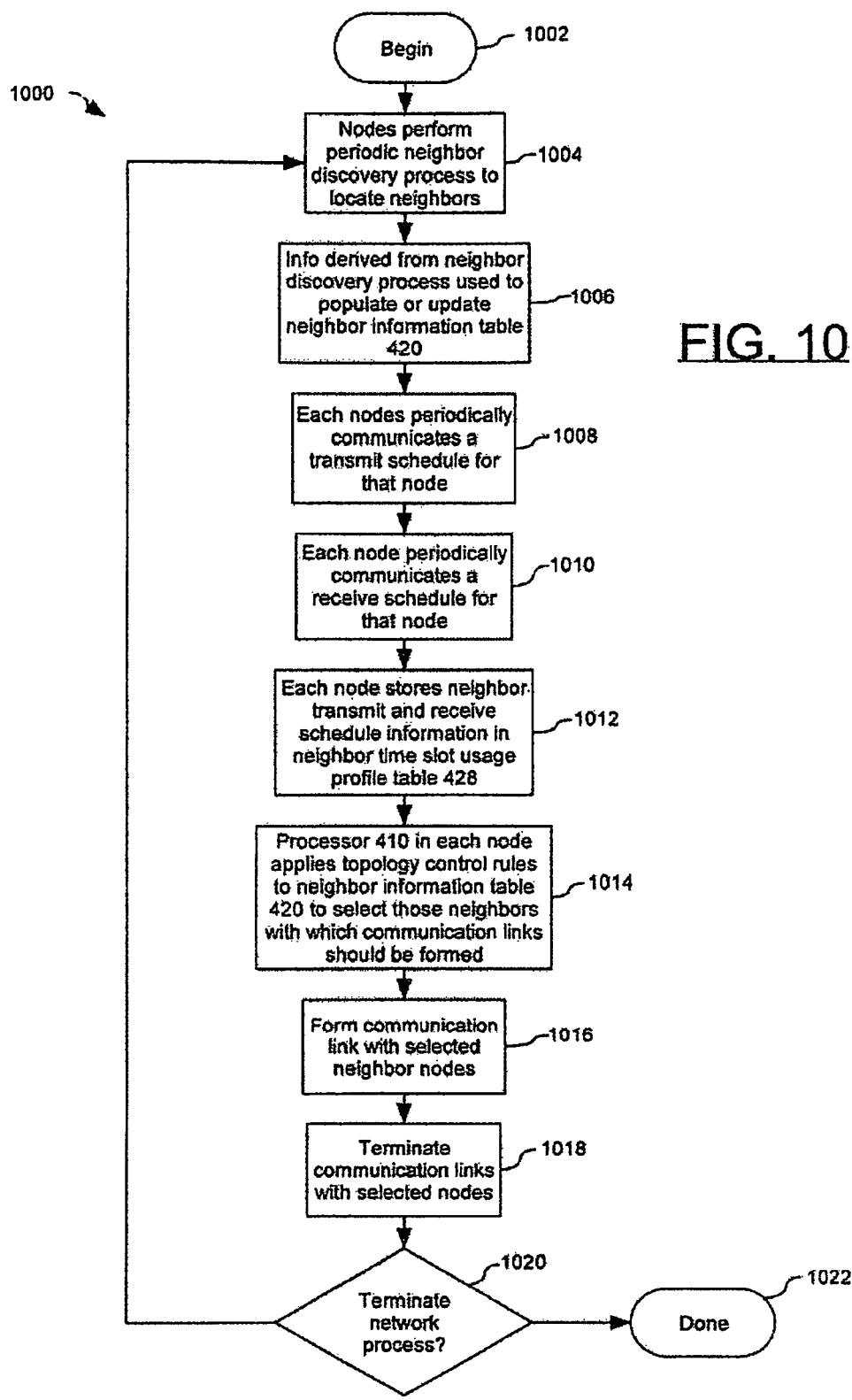
FIG. 10 is a flowchart that is useful for understanding an interaction among various nodes in a mobile ad-hoc network.

The flowcharts in FIGS. 10-14 will now be used to explain how the concepts discussed above in relation to FIGS. 6-9 can be applied in a mobile ad-hoc network. FIG. 10 provides a basic overview of a mobile ad-hoc network process 1000. It will be understood that the scheduler process described in relation to FIGS. 6-9 requires detailed information regarding the identification, position, and communication schedule of neighbor nodes. Process 1000 is useful for understanding how such information is exchanged. Still, it should be understood that the process 1000 merely discloses one possible process for exchange of such data and the invention is not intended to be so limited. Instead, any other process for exchanging node identification, position, and communication schedule can be used. Further, it should be understood that all of the foregoing information can be exchanged using one or more control channels. For example, one or more mini-slots can be defined as control channels which are reserved for exchange of such information.

The process 1000 begins in step 1002 and continues with step 1004. In step 1004, nodes in a network engage in a neighbor discovery process. Neighbor discovery processes in mobile ad-hoc networks are generally well known. Accordingly, the details of this process will not be described here. However, it should be understood that the neighbor discovery process involves transmission of "hello" messages to neighboring nodes using a control channel. The "hello" message can be broadcast to neighboring nodes by any suitable means. For example, the "hello" message can be transmitted by using an omni-directional antenna 402 or a scanned beam provided by directional antenna 403.

The "hello" message can include node identifier information and a position report for the node which transmits the message. Each node determines its own position using the node position unit 416. Each node also collects identifying information and position information from its neighbors using these "hello" messages.

In step 1006, information derived from the neighbor discovery process in step 1004 is used to populate (and/or update) neighbor information tables at each node. For example, node identification and position information can be stored in a neighbor information table 420. Each node further maintains an epoch schedule 422 which provides timing information for the occurrence of each data epoch 504. Timing of mini-slots 506 can also be derived from the epoch schedule 422.

The network process 1000 continues with step 1008 in which each node periodically communicates to its neighbors a transmit schedule or portion of the transmit schedule indicating changes since the last schedule update for that node. In step 1010, each node also periodically broadcasts to its neighbors a receive schedule or portion of the receive schedule indicating changes since the last schedule update for that node. In step 1012, each node stores neighbor transmit and receive information in the table in FIG. 4 identified as the neighbor time slot usage profile 428.

The process continues in step 1014 in which each node uses processor 410 to apply topology control rules to the information stored in its neighbor information table 420. The topology control rules can be stored in memory device 450. The topology control rules are used to select one or more neighbor nodes with which communication links should be established. Topology control rules for mobile ad-hoc networks are well known in the art and therefore will not be described here in detail. However, it should be understood that such topology control rules can allow a node to determine whether communication links with various neighbor nodes should be established, maintained, or terminated.

In step 1016, new communication links are formed with selected neighboring nodes as determined by the topology control rules. This process of forming links with new nodes will be described in more detail in relation to FIGS. 11-14. In step 1018, certain communication links are terminated with selected neighbor nodes as determined by topology control rules. In step 1020, a determination is made as to whether the network process should be terminated for any reason. If so, then the process terminates in step 1022. Alternatively, the process continues with step 1004 and repeats.

Figure 11:
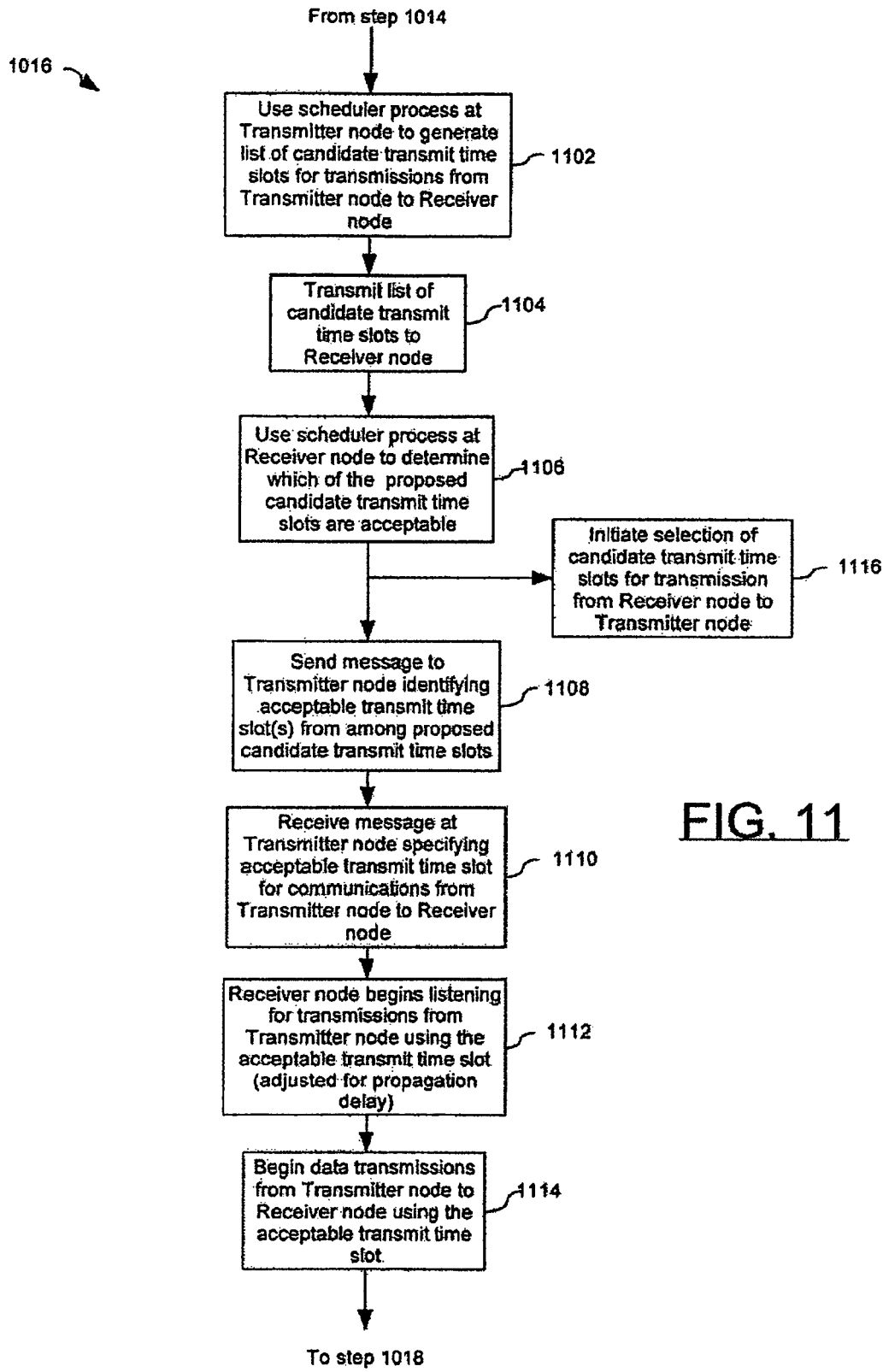
FIG. 11 is a flowchart that provides additional detail relating to step 1016 in FIG. 10.

FIG. 11 shows a series of steps which provide further detail concerning step 1016 in FIG. 10. Step 1016 involves one node forming a communication link with a selected neighbor node. Establishing this communication link begins with selection of a suitable time slot when a first node (transmitter node) will transmit data to a second node (receiver node).

As shown in FIG. 11, step 1016 includes a series of steps which can begin with step 1102. Step 1102 includes using a scheduler process at the transmitter node to generate a list of candidate transmit time slots for transmissions from the transmitter node to the receiver node. The scheduler process can be performed by processor 410 executing a programmed set of instructions. Alternatively, the scheduler process can be implemented as any other combination of hardware and software. Step 1102 is described in greater detail in FIG. 12. In general, however, the list of candidate time slots can be generated using an interference analysis similar to that described in relation to FIGS. 6-7 which accounts for the distance between the transmitting and receiving node. In this regard it may be noted that in FIGS. 6 and 7 the transmitter node was node 4042 and the receiver node was 4044.

In step 1104, the list of candidate transmit time slots can be communicated from the transmitter node to the receiver node. Any suitable means can be used for communicating this candidate transmit time slot list from the transmitter node to the receiver node. For example, a dedicated control channel can be used for this purpose. Still, the invention is not limited in this regard.

In step 1106, the candidate transmit time slot list is received and used at the receiver node to determine which of the proposed candidate time slots are acceptable. Step 1106 is described in greater detail in FIG. 13. In general, however, acceptable candidate time slots can be determined using a process similar to that previously described in relation to FIGS. 8-9. Following steps 1106, the receiver node will now be aware that transmitter node wishes to establish a transmit time slot for communications to receiver node. Consequently, the receiver node can initiate another process similar to that described in step 1016 for the purpose of establishing a transmit time slot for communications from the receiver node to the transmitter node. To avoid redundancy, that process will not be described here.

Continuing on now with step 1108, a message can be sent from the receiver node to the transmitter node. The message identifies those transmit time slots proposed by the transmitter node which are determined to be acceptable to the receiver node. In step 1110, this message is received at transmitter node. The process continues on to step 1112 in which the receiver node begins listening for transmissions from the transmitter node during the time slot which has been accepted by the transmitter node. The time at which the receiver begins to listen for the transmission from the transmitter node is delayed from the beginning of the time slot by the distance between the transmitting and receiving node. Although not required, it may be desirable for the receiver to begin listening slightly before the expected time to account for uncertainties in the network timing and node positions. In step 1114 data transmissions can begin from the transmitter node to the receiver node using the time slot that has been selected. Thereafter, the process can continue on to step 1018 as previously described.

Figure 12:
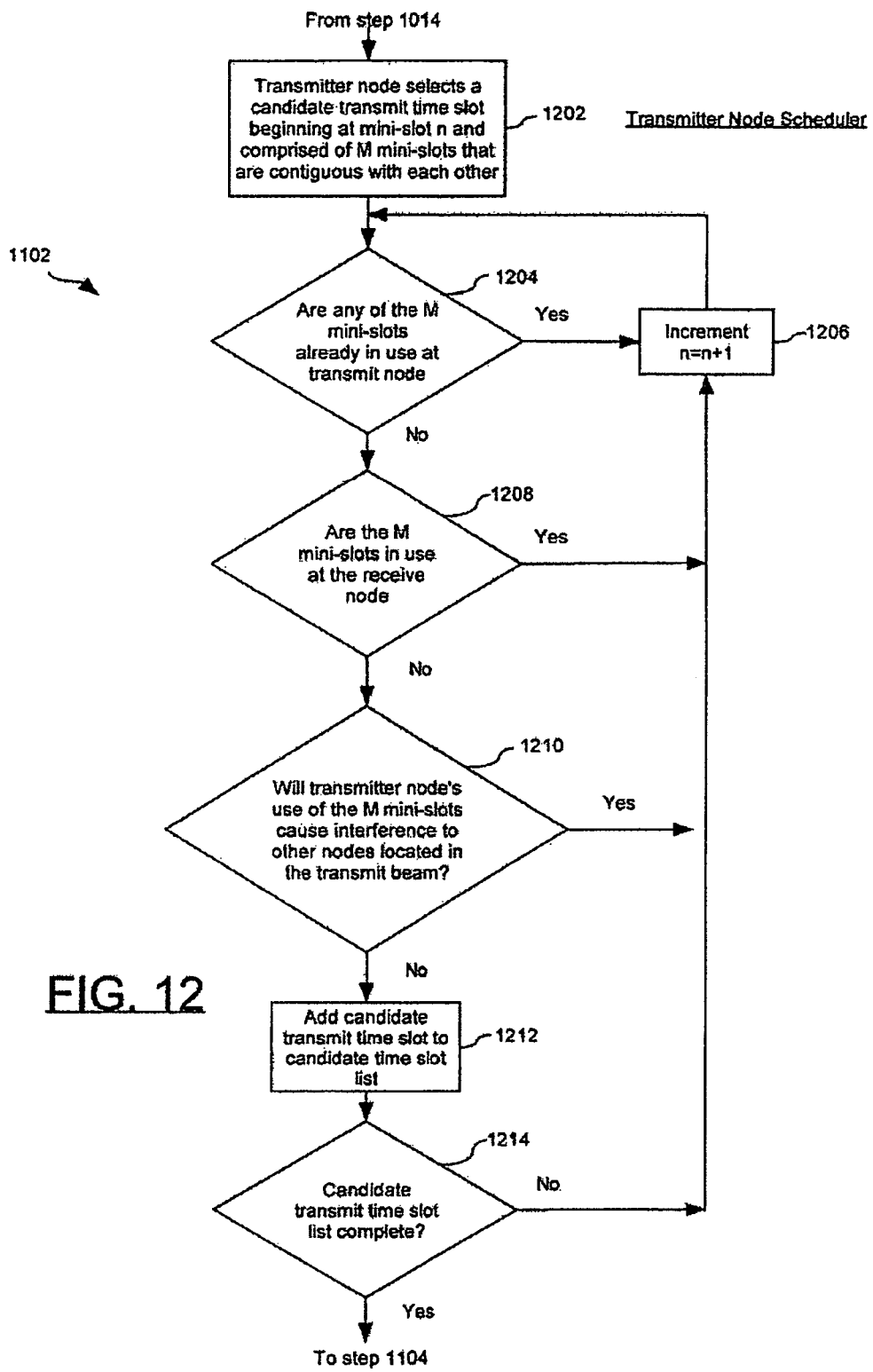
FIG. 12 is a flowchart that provides additional detail relating to step 1102 in FIG. 11.
Figure 13:
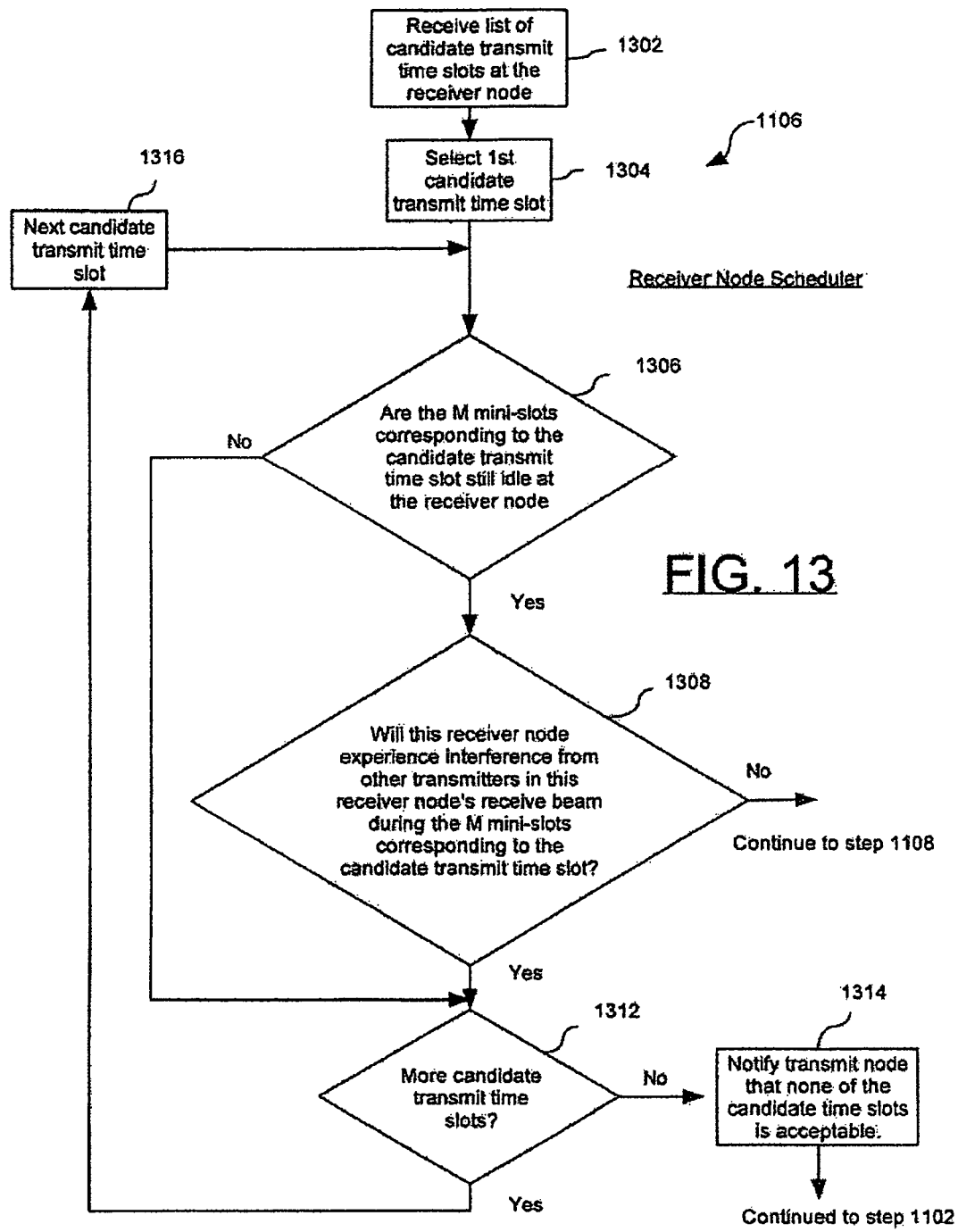
FIG. 13 is a flowchart that provides additional detail relating to step 1106 in FIG. 11.

Referring now to FIG. 12, there is provided a more detailed description of the processes associated with step 1102 in FIG. 11. Step 1102 involves using a scheduler process at the transmitter node to generate a list of candidate transmit time slots for transmissions from the transmitter node to the receiver node. As an aid to understanding, step 1102 will be described with reference to FIG. 5.

The process can begin with step 1202 in which the scheduler process at the transmitter node selects a candidate transmit time slot beginning at mini-slot n and comprised of M mini-slots that are contiguous with each other. For example, in FIG. 5 a candidate time slot can be time slot 508 which begins at mini-slot 4 and continues through mini-slot 11 (M=8). In step 1204, the scheduler process checks the transmitter node's transmit and receive schedule to determine whether any of the M mini-slots comprising the candidate time slot is already in use at the transmit node (for receiving or transmitting). The transmitter node's transmit and receive schedule can be stored in memory 450. If any of the M mini-slots are currently in use, then the candidate time slot is not acceptable and the process continues to step 1206. In step 1206, the value of n is incremented and the step 1204 is repeated with a different set of M mini-slots. For convenience, the value of n can be incremented by 1. However, the invention is not limited in this regard. For example, the value of n could be incremented by M or any other value.

In step 1204, if none of the M mini-slots are currently in use at the transmitter node, then the process continues on to step 1208. In step 1208, the scheduler process determines whether any of the M mini-slots are in use at the receiver node. Information concerning time slot usage at the receive node can be obtained from the neighbor time slot usage profile 428 which is stored in memory device 450. If any of the time slots are currently in use at the receiver node, the process can return to step 1206 where the value of n is incremented to select a different set of M mini-slots. Alternatively, if the M mini-slots are not in use at the receiver node, then the process continues on to step 1210.

In step 1210, the scheduler process in the transmitter node determines whether the transmitter node's use of the M mini-slots associated will cause interference to neighboring nodes located in the transmit beam of the transmitter node (when pointed toward the receiver node). This process for mitigating interference is described below in more detail in relation to FIG. 14. If the scheduler process determines that use of the M mini-slots by the transmitter node will cause interference to neighboring nodes, then the process returns to step 1206 and an alternative set of mini-slots is selected for evaluation. Conversely, if the scheduler process determines that use of the M mini-slots by the transmitter node will not cause interference to neighboring nodes, then the process continues on to step 1212.

In step 1212, the candidate time slot comprised of the M mini-slots is added to a list of candidate time slots which can be used. Thereafter, in step 1214, a determination is made as to whether the candidate transmit time slot list is complete. This determination can be based on any one of several considerations. For example, the list can be deemed complete when a predetermined number of candidate transmit time slots have been identified. Alternatively, the list can be complete when all possible candidate time slots have been considered.

Figure 14:
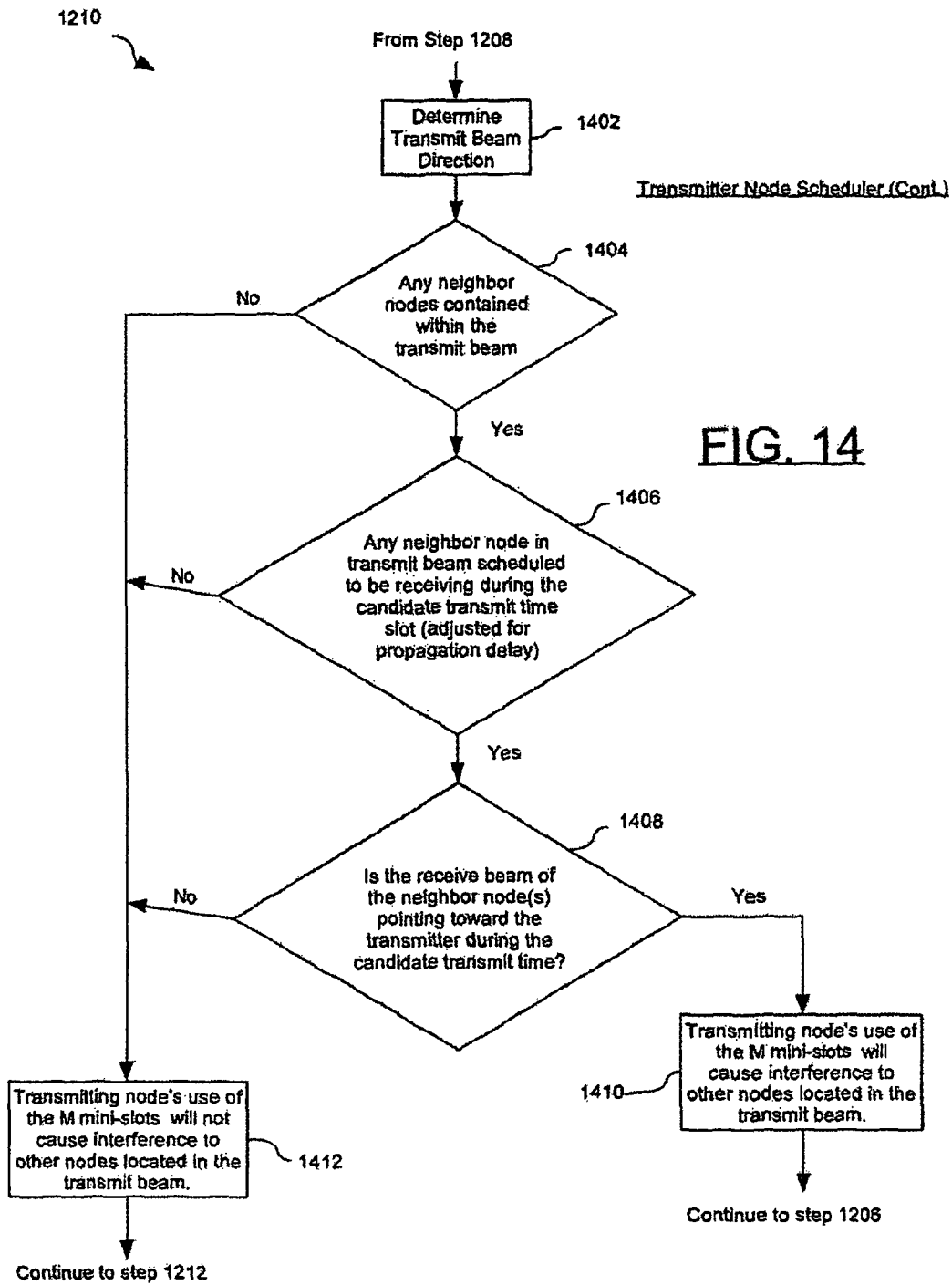
FIG. 14 is a flowchart that provides additional detail relating to step 1210 in FIG. 12.

Referring now to FIG. 14, there is provided a more detailed description of the process associated with step 1210 in FIG. 12. It may be recalled from the discussion regarding FIG. 12, that step 1210 generally involves a scheduler process at the transmitter node. The scheduler process is used to evaluate potential interference caused by the transmitting node's use of the M mini-slots associated with the candidate time slot. In particular, this scheduler process determines whether the transmissions by the transmitter node during the candidate time slot, using an antenna beam pointing toward the receiver node, will cause interference to other neighboring nodes that are also located in the transmit beam. As an aid in understanding, the process will be described with reference to FIGS. 6 and 7 in which node 4042 is considered the transmitter node and node 4044 is considered to be the receiver node.

The process in FIG. 14 begins with step 1402 in which the transmitter scheduler at the transmitter node determines a direction that it's transmit beam will be pointed for the purpose of communicating with the receiver node. In the context of FIGS. 6 and 7, this means that the node 4042 will determine which direction its antenna beam 602 should point for communications with node 4044. Once the direction of the transmitter beam has been determined in step 1402, the scheduler process at the transmitter node (4042) will determine in step 1404 whether there are any neighbor nodes that are contained within the transmit beam. If not, then it can be assumed that the transmitter node's use of the M mini-slots will not cause interference to any other nodes and the process will continue on to step 1412.

Alternatively, if it is determined in step 1404 that there are neighbor nodes contained within the transmit beam, then the process continues on to step 1406. For example, in FIG. 6 nodes 4046, 4047, 4049 are in the transmit beam 602 (in addition to node 4044). In step 1406 the scheduler process determines whether there are any neighbor nodes in the transmit beam that are scheduled to be receiving during the candidate transmit time slot as adjusted for propagation delay. This concept is illustrated in FIG. 7. In step 1406, the transmitter scheduler would determine whether any of the nodes 4046, 4047, 4049 are scheduled to be receiving during time intervals 706, 707, 709. If not, then it can be assumed that no interference will occur and the scheduler process continues on to step 1412. Otherwise, the scheduler process goes on to step 1408.

In step 1408, a determination is made as to whether any of the receive beams of the neighbor nodes that will be receiving during the selected time interval as determined in step 1406 is pointing generally toward the transmitter during the candidate transmit time (adjusted for propagation delay). In the context of FIG. 7, this would mean determining whether the antenna beams of any of the nodes 4046, 4047, 4049 are pointing toward the transmitter node 4042. In FIG. 6, it can be observed that antenna beam 606 of node 4046 is pointing toward the transmitter node 4042 during time interval 706. In this example, the scheduler process would continue on to step 1410 and determine that the transmitter node's use of the M mini-slots associated with a particular candidate time slot will cause interference to the other nodes located in the transmit beam. Those skilled in the art will appreciate that the interference calculation in step 1408 may advantageously consider the side lobe characteristics of the transmitting and receiving antenna patterns and the distance between the transmitting and receiving nodes to determine if harmful interference could occur at a receiving node. The process would then continue on to step 1206 in FIG. 12. Alternatively, the scheduler process continues to step 1412 and determine that the transmitter node's use of the M mini-slots will not cause interference. From step 1412, the process continues on to step 1212 where the candidate time slot is added to the candidate time slot list.

It may be recalled from FIG. 11 that once a suitable list of candidate transmit time slots has been compiled in step 1102, this list is communicated to the receiver in step 1104. Thereafter, in step 1106 the scheduling process at the receiver determines which, if any, of the candidate time slots are acceptable. Step 1106 will now be described in further detail with reference to FIG. 13. The process can begin in step 1302 when the receiver scheduler receives the list of candidate transmit time slots at the receiver node. The process continues on to step 1304 in which the receiver scheduler selects the first candidate time slot on the list for evaluation.

The evaluation process begins in step 1306 with the receiver scheduler process at the receiver node determining whether the M mini-slots corresponding to the candidate transmit time slot are still idle and are therefore available. This step is somewhat redundant because a similar check is performed in step 1208. However, it will be appreciated that the transmit and receive schedule at the receiver node will often contain scheduling information for the receiver mode that is more current than the corresponding information for the receiver node that is stored in at the transmitter node. Accordingly, step 1306 is a useful verification that the M mini-slots are still idle.

If the M mini-slots are determined to be no longer idle, then the process continues on to step 1312 where the receiver scheduler process determines whether there are any more candidate transmit time slots on the candidate transmit time slot list. Alternatively, in step 1306, if the M mini-slots associated with a candidate time slot are in fact available, then the process continues on to step 1308.

In step 1308, the receiver scheduler process at the receiver node determines whether the receiver node will experience interference from network nodes other than the transmitter node. Step 1308 is described in greater detail in relation to FIG. 15. However, it should be understood that the receiver scheduler process in step 1308 determines whether the receiver node will experience interference from other neighboring nodes during the M mini-slots corresponding to the candidate transmit time slot (as adjusted in time to compensate for propagation delay). If, in step 1308, the receiver scheduler process determines that no interference will result from neighboring nodes, then the process continues on to step 1108 in FIG. 11. In step 1108, a message is sent to the transmitter node indicating that the candidate time slot is acceptable to the receiver node. Alternatively, if the receiver scheduler process determines that the receiver node will experience interference from other neighboring nodes, then the process continues on to step 1312.

In step 1312, the receiver scheduler process determines whether there are any other candidate time slots on the candidate time slot list. If so, then the receiver scheduler process continues on to step 1316 where the next candidate time slot is selected. Alternatively, if there are no more candidate time slots on the list, the receiver scheduler process continues on to step 1314 in which the receiver node notifies the transmitter node that none of the candidate time slots are acceptable. The receiver scheduler process then returns to step 1102 in FIG. 11, where a new list of candidate time slots is generated at the transmitter node.

Figure 15:
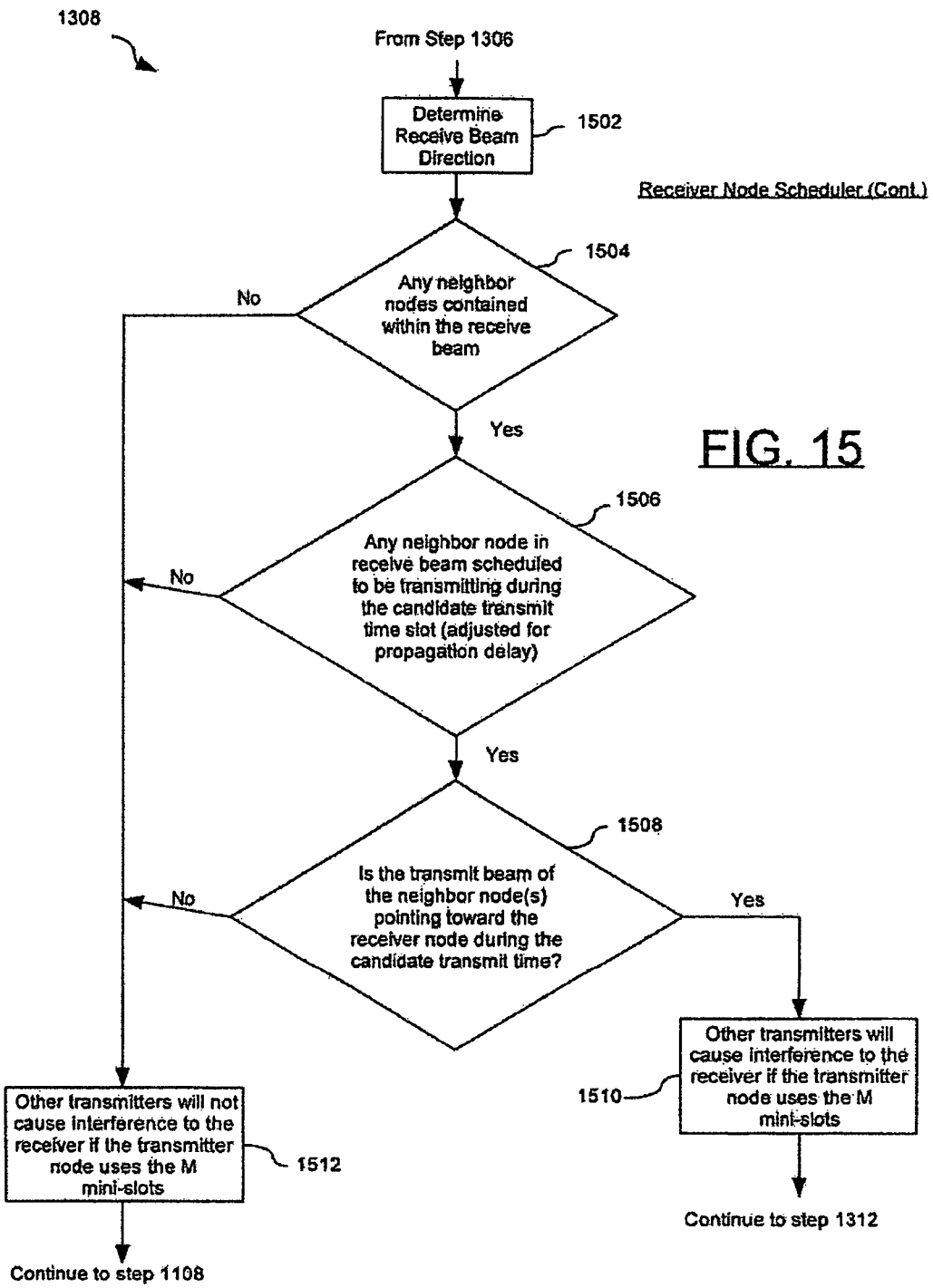
FIG. 15 is a flowchart that provides additional detail relating to step 1308 in FIG. 13.

Referring now to FIG. 15, the processes associated with step 1308 will now be described in greater detail. The process in FIG. 15 begins with step 1502 in which the scheduler process at the receiver node determines a direction that it's receive beam will be pointed for the purpose of receiving communications from the transmitter node. In the context of FIGS. 8 and 9, this means that the node 4044 will determine which direction its receiver antenna beam 812 will need to point towards for communications with node 4042. Once the direction of the receiver antenna beam 812 has been determined in step 1502, the scheduler process at the receiver node (4044) will determine in step 1504 whether there are any neighbor nodes that are contained within the receiver antenna beam 812.

If it is determined in step 1504 that there are no neighbor nodes contained within the receiver antenna beam 812, then the process continues in step 1512. In step 1512, the scheduler process determines that the receiver node 4044 will not experience interference from other transmitting nodes during the time interval corresponding to the M mini-slots (as adjusted for propagation delay). Accordingly, the process will thereafter continue on to step 1108 in FIG. 11.

Alternatively, if it is determined in step 1504 that there are neighbor nodes contained within the receiver antenna beam 812, then the process continues on to step 1506. For example, in FIG. 8 nodes 4041, 4043, 4045 are in the receiver antenna beam 812 (in addition to node 4042). Accordingly, the process would continue on to step 1506 in the example shown in FIG. 8.

In step 1506 the scheduler process at the receiver node determines whether transmitted signals from any neighbor nodes in the receiver beam 812 can potentially be received at the receiver node 4044 during any of the mini-slots corresponding to the time interval 704. This concept is illustrated in FIG. 9. Recall that time interval 704 is the period of time during which a transmission from transmitter node 4042 will actually be received at receiver node 4044 (assuming that the signal is transmitted from node 4042 during time slot 702). Similarly, time intervals 901, 903, 905 represent those transmission time intervals for nodes 4041, 4043, 4045 that will result in signals actually being received at receiver node 4044 during time interval 704.

In step 1506, if none of the nodes 4041, 4043, 4045 are actually scheduled to be transmitting during the time periods 901, 903, 905, then it can be concluded that no interference will be caused at the receiver node 4044 during time interval 704. In that case, the transmit time slot 702 would be an acceptable time slot during which node 4042 can transmit to node 4044, and the scheduler process continues on to step 1512. Conversely, if any of the nodes 4041, 4043, 4045 are actually scheduled to be transmitting during the time periods 901, 903, 905, then such transmissions can potentially cause interference at the receiver node 4044 during time interval 704. In that case, the transmit time slot 702 may not be an acceptable time slot during which node 4042 can transmit to node 4044. Accordingly, the scheduler process will continue on to step 1508.

In step 1508, a determination is made as to whether an antenna beam of any neighbor nodes that is actually pointed toward the receiver 4044 during a time interval when the receiver is expecting to receive signals from the transmitter node. In the context of FIG. 9, this would mean determining whether the antenna beams of any of the nodes 4041, 4043, 4045 are pointing toward the receiver node 4044 during time intervals 901, 903, 905. If so, then the scheduler continues on to step 1510 where it determines that other transmitters will cause interference to the receiver if the transmitter node uses the M mini-slots associated with a candidate transmit time slot such as slot 702. Those skilled in the art will appreciate that the interference calculation in step 1508 may advantageously consider the side lobe characteristics of the transmitting and receiving antenna patterns and the distance between the transmitting and receiving nodes to determine if harmful interference could occur at a receiving node. Following step 1510, the scheduler process at the receiver node continues on to step 1312 in FIG. 13. In step 1312 the scheduler process checks to see if other candidate time slots are available and continues on as described above.

Figure 16:
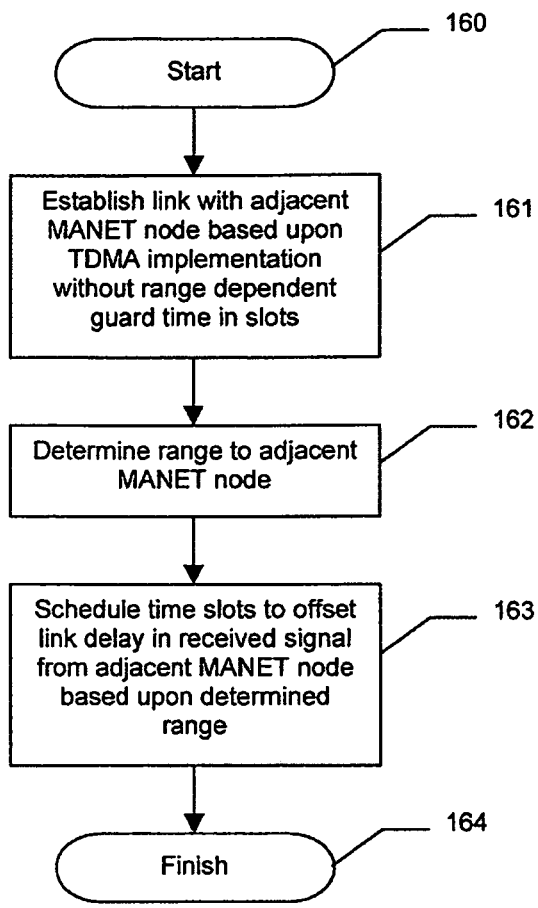
FIGS. 16-18 are flowcharts illustrating additional MANET communication method aspects of the invention.
Figure 17:
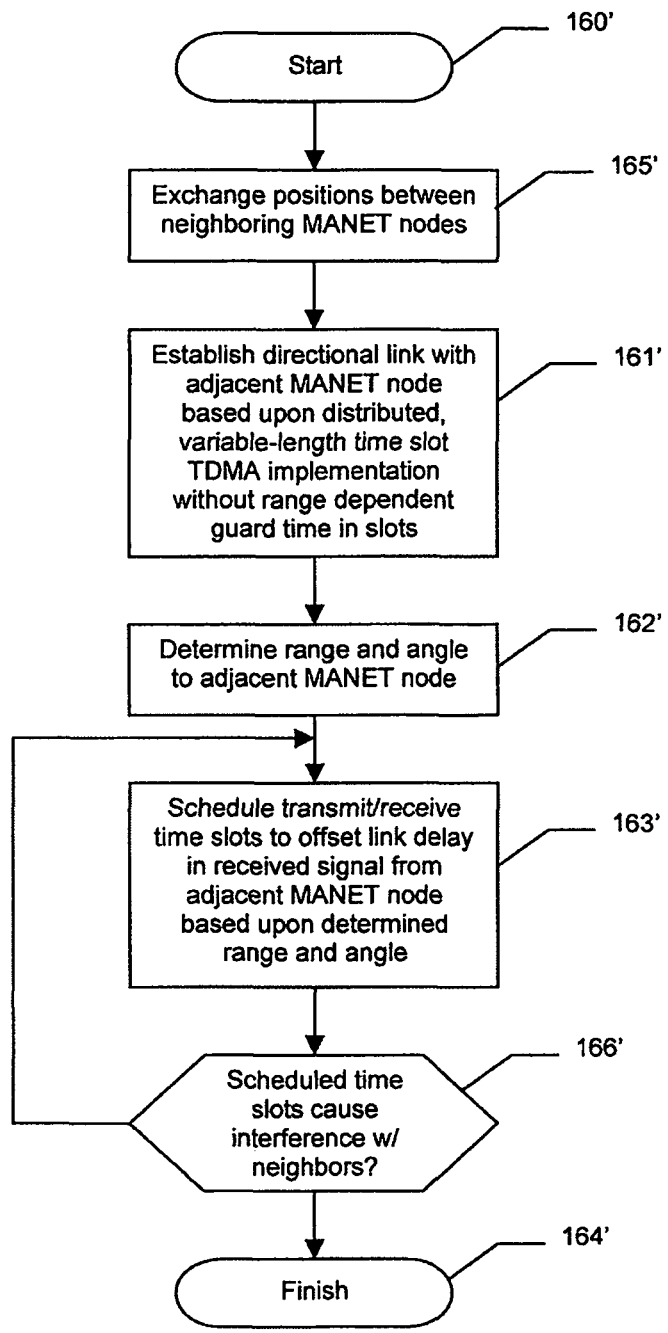

Referring additionally to FIGS. 16 and 17, another advantageous aspect is now described in which the nodes 404 operate and establish communications links therebetween based upon a TDMA implementation that does not use range dependent guard times, at Blocks 160-161. More particularly, since the controller or control unit 408 knows its current position, as well as the position information of its neighboring nodes from the exchange of such information between nodes which is stored in the neighbor information table 420 (Block 165'), the controller may therefore determine the range (and optionally angle) to the adjacent node it is communicating with, as described above. As a result, the controller 408 may therefore advantageously use this range (and, optionally, angle) information to schedule time slots to offset a link delay in a received signal from the adjacent MANET node, without the need for a built in guard time, at Block 163, thus concluding the method in FIG. 16 (Block 164).

That is, since the controller 408 advantageously implements the above-described distributed TDMA scheduling operations with variable-length time slot (i.e., mini-slot) allocation, the range effects due to link delay may therefore be removed, as will be appreciated by those skilled in the art. As noted above, heuristics may advantageously be used to provide an efficient distributed schedule that includes both range and angle (for directional antenna isolation) in the calculations, which can advantageously reduce control overhead while at the same time scheduling time slots to reduce a likelihood of interference, at Block 166', as discussed further above. It should be noted that in this TDMA implementation (and the following discussed with reference to FIGS. 18-19), an omni-directional link may be used in some applications as well as directional links.

Moreover, either receiver-oriented or transmitter-oriented scheduling of the variable length time slots may be used. Additionally, flexibility of time slot assignment is also provided. For example, if the required capacity can be delivered by eight minislots, there may be no string of eight contiguous minislots that meet the interference criteria. However, it may be possible for two groups of four minislots or four groups of two minislots to provide the capacity and meet the interference criteria, which may advantageously be done in accordance with the invention. Generally speaking, as link bit rate changes with range or propagation or interference, it is more efficient to provide capacity using variable time slots than with fixed time slots, although fixed time slots may also be used in some embodiments.

Figure 18:
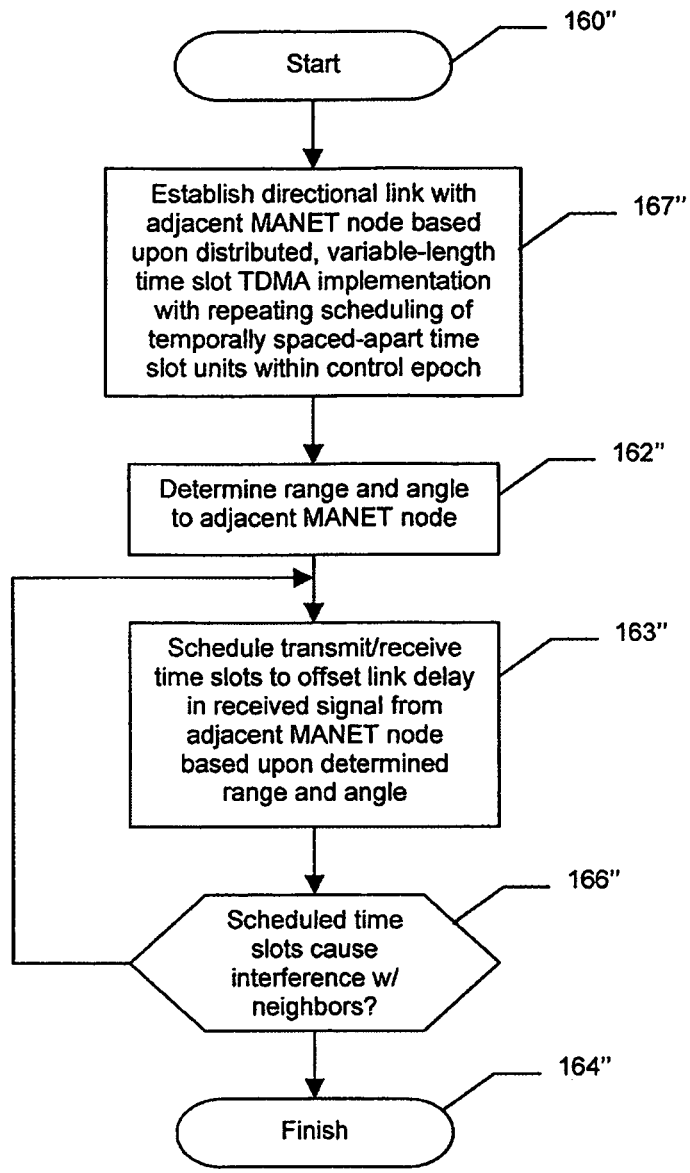
Figure 19:
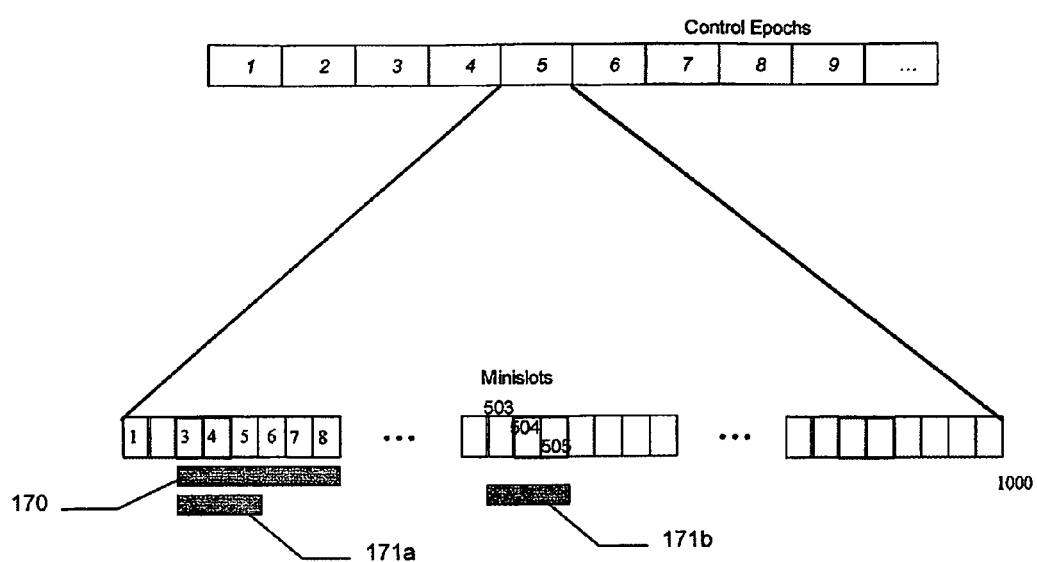
FIG. 19 is a time slot diagram illustrating time slot scheduling in accordance with the method illustrated in FIG. 18.

Turning now to FIGS. 18-19, another advantageous aspect is described in which the TDMA implementation uses a repeating scheduling of a plurality of temporally spaced-apart time slot units within a control epoch to thereby advantageously reduce a latency of communication (Block 167'). More particularly, the above-noted variable time slot control implementation may advantageously be used to adjust the TDMA schedule to jointly optimize the capacity and latency assigned to a connection. FIG. 19 shows the timing of an exemplary TDMA format. In the illustrated example, each control epoch includes Nm=1000 mini-slots, as shown. In a fixed time slot length TDMA implementation, all time slots include a same number of slots or mini-slots.

In a variable length TDMA implementation, the time slots can vary in length from Nmin to Nmax mini-slots. Moreover, time slots can also start in any mini-slot. This is shown in FIG. 19 by a time slot 170 that includes six mini-slots (i.e., mini-slots 3-8), and other time slots 171a, 171b which include three mini-slots each (i.e., 3-5 and 503-505, respectively). If the TDMA schedule is unchanged during a sequence of control epochs, the time slot assignments repeat during every control epoch.

Consider a variable length time slot TDMA system. For a fixed schedule, during the time the schedule is executed, the capacity assigned to a connection is given by:

$$C_i = \frac{N_i T_{ms} R_i}{T_c},$$

where $C_i$ is the instantaneous capacity of the connection, $N_i$ is the number of mini-slots assigned to the time slot, $R_i$ is the current over-the-air link rate, $T_{ms}$ is the time duration of a mini-slot, and $T_c$ is the time duration of a control epoch. For a specific numerical example, consider a variable length time slot TDMA system where the mini-slot time duration $T_{ms}$ is 0.1 msec, the control epoch $T_c$ is 100 msec, and the instantaneous link rate $R_i$ is 10 mbps. If a connection is assigned a time slot including one mini-slot, then the connection has a capacity of 10 kbps.

Consider the case where the scheduler is required to assign 60 kbps capacity to a connection. The time slot 170 in begins at mini-slot 3 and ends after mini-slot 8. Based on the above calculation, this provides 60 kbps of capacity. The worst case latency occurs when a packet arrives from the router in mini-slot 3 (assuming that the radio is unable to send anything in the time slot that has not been in the transmit buffer prior to mini-slot 3), and has to wait an entire control epoch before it can be transmitted. For a uniform random distribution of arrival times, the average wait time is then one half the control epoch or 50 msec.

By comparison, use of the temporally spaced-apart time slot units 171a, 171b provides an alternate scheduling approach that provides the required 60 kbps capacity to the connection, but also advantageously reduces latency. More particularly, the pair of time slot units 171a, 171b provides a total of six mini-slots to give the requisite 60 kbps capacity. However, the worst case waiting time is reduced to one half of the control epoch length, since there are two time slots 171a, 171b temporally equally spaced-apart in each epoch. Thus, a packet arriving in mini-slot 3 needs only to wait until the mini-slot 503 to begin transmission. So, for a uniform distribution of arrival times, the average waiting time in this case is one quarter the control epoch length. It will be appreciated that in some embodiments this approach may be implanted using regular time slots (i.e., as opposed to mini-slots), and that other numbers may also be used.

For example, the latency may be further reduced by spacing three transmissions of two mini-slots each in the control epoch, or six transmissions of one mini-slot each in the control epoch. However, it will be appreciated that the latency savings achieved thereby are bounded by the overhead associated with such a transmission. That is, at some point this overhead will reduce the efficiency to a degree that the marginal gain in latency will not be desirable, so it is typically desirable to balance the latency and overhead based upon the given implementation, as will be appreciated by those skilled in the art. Also, when scheduling one or more time slots using this approach, the interference calculations and current schedule will affect the placement of the time slots. Interference is preferably considered when determining the scheduling of the time slots in addition to the capacity and latency.

Scheduling the one or more timeslots using a fixed separation rule for timeslot distribution through the epoch may result in poor interference performance, since with a fixed separation rule, interference between two or more nodes in one timeslot may also result in interference between the same nodes in all timeslots. A fully random separation process, on the other hand, may not assure that the timeslots on a link are well distributed throughout the epoch. Thus, while either approach could be used in certain embodiments, another approach for distribution may advantageously both distribute the timeslots through the epoch and also vary the spacing between the timeslots used on any one link.

An exemplary algorithm for the separation rule that provides distributed timeslots is to divide the epoch into a number of sub-divisions. These sub-divisions can then be used to achieve the desired distribution and variable separation using the following multi-step rule.
1. Assign the first timeslot to a link based upon interference calculations as discussed above.
2. Preferentially assign the second timeslot to the same link in the frame spaced one-half epoch away from the first frame. The exact timeslot (or set of mini-slots) is defined using the interference avoidance rules as described above with the search beginning in the preferred frame.
3. Add other timeslots to the same link in a similar manner where the preferred frame (i.e., the frame where the search for a suitable timeslot is to begin) is a frame that is equally spaced from all of the frames where the link already has a timeslot assigned.
4. In the unlikely event that all frames have a timeslot for a particular link and even more timeslots are required, add the next timeslot preferentially to the first frame where a timeslot was assigned and continue the process as above.

An alternate embodiment for the distributed timeslot assignment algorithm would be to begin the search for the next suitable timeslot on a link at a mini-slot defined by adding an integer number of mini-slots to the last mini-slot in the previously assigned timeslot, where the integer is defined by adding a fixed separation equal to one-half the average distance between the other slots assigned to the same link to a random number of minislots. The average of this random number should be relatively small. For example, in one embodiment this average value is set to two times the number of mini-slots used in a timeslot. Other choices for the distribution algorithm will occur to those skilled in the art.

An exemplary scheme for variable length time slots will now be described. Here a metric is used that is based upon an average utilization of the transmit time slots allocated on a connection, namely Tx_Time slot_Utilization=a moving average of the utilization of the multiple variable length time slots allocated on a connection. One can set parameters for minimum time slot length, Min_TS_Len and maximum time slot length, Max_TS_Len, and assume upper and lower thresholds are set for the metric, Tx_Time slot_Utilization, which are used for determining whether to add or subtract capacity on that connection. These thresholds are Tx_Util_upper and Tx_Util_lower. Capacity will be added or released to control the utilization and keep it within the range of these upper and lower thresholds.

The amount of capacity that will be released or added on one operation will be determined as a change in utilization by a fractional adjustment of the current capacity allocation using $$Kfrac = Ku*(Tx\_Util\_upper - Tx\_Util\_lower),$$

where Ku is in the range of 0.1 to 0.5. This will make the adjustment a small enough amount so that it will not result in limit cycle behavior. The resulting change in the utilization will be to move utilization from one side of a threshold to, at worst, the other side of that threshold, but not to the other threshold. Denoting the current capacity allocation (i.e., the amount of time in the epoch allocated to this transmit connection) as Cur_Tx_Time_per_Epoch, then the increment of additional time added or released on one operation will be $$New\_Time\_Increment = Kfrac*Cur\_Tx\_Time\_per\_Epoch.$$

Thus, if the utilization is too high, and additional capacity is needed, the new time allocation per epoch is $$New\_Cur\_Tx\_Time\_per\_Epoch = Cur\_Tx\_Time\_per\_Epoch + New\_Time\_Increment.$$

Similarly, we subtract the New_Time_Increment if we need to release capacity. This can be summarized by the following algorithm:

---
If Tx_Time slot_Utilization < Tx_Util_lower
    Release New_Time_Increment of capacity
Else if Tx_Time slot_Utilization > Tx_Util_upper
    Add New_Time_Increment of capacity
Else do nothing.

---

If an increment of capacity is added or released, the controller 408 may wait a small number of epochs before taking further action to allow the estimate of Tx_Time slot_Utilization to settle on a new value. These algorithms may be applied to TDMA formats that use mini-slots as in FIG. 19, or formats that use variable length time slots that are continuously variable. In the cases of mini-slots, the New_Time_Increment may be rounded to the nearest mini-slot.

If the utilization evaluation indicates that capacity should be released on a transmit connection, then the following procedures my be used. Capacity can be released without negotiating with the receiving node or evaluating if the release causes interference. The capacity allocation is denoted by Cur_Tx_Time_per_Epoch, which includes a set of k time slots with lengths T1, T2, ..., Tk. Each of these time slots preferably has a length that is not less than Min_TS_Len. The capacity is released by reducing the allocation to the set of time slots by an amount equal to the New_Time_Increment. Thus, the new values of the time slot allocations will satisfy $$\sum_{i=1}^{k} Ti = Cur\_Tx\_Time\_per\_Epoch - New\_Time\_Increment$$

The priorities used for accomplishing this reduction in time allocation per epoch can have a number of variations. One exemplary approach is the following:
(1) The transmit node determines how to modify the time slot lengths. The highest priority is to reduce the individual time slot allocations while keeping all of them greater than the Min_TS_Len. A time slot may be reduced in length either by eliminating some of the time from the start of the frame, the end of the frame or both.
(2) If the time slots are already so short that the capacity cannot be reduced enough by shortening the time slots, then a time slot is preferably released. The highest priority time slot to release is the minimum length time slot which has length greater than Min_TS_Len.

(3) If no time slot satisfying (2) can be found, then the maximum length time slot is released.

After capacity is released, the transmit node notifies the receiving node via an in-band control message of the details of the capacity release (time slot allocation changes). When the utilization evaluation indicates that capacity should be added to a transmit connection, the resulting change in capacity allocation is done while evaluating if any interference constraints are violated, and the change in allocation should be agreed to by the receiving node. Once the need to increase capacity is determined, then the value of New_Time_Increment is calculated. Then the new allocations to time slot lengths should satisfy the following:

$$\sum_{i=1}^{k} Ti = \text{Cur\_Tx\_Time\_per\_Epoch} + \text{New\_Time\_Increment}$$

Several approaches could be used in lengthening the time slot allocations or adding new time slots. One example is as follows:

(1) The transmit node evaluates the interference constraint impact of adding additional time at either the start or end of each time slot, or both, while keeping the new time slot length to no more than Max_TS_Len. The value of New_Time_Increment is allocated across as many time slots as possible and as equally as possible.

(2) If the currently allocated time slots are already so long that New_Time_Increment cannot be fully allocated, then a new time slot is added with this length. Interference constraints should be evaluated to determine where in the epoch this time slot should be placed.

(3) If no time slot candidate as large as needed in (2) can be found, then a candidate time slot may be built from a list of shorter time slots. In addition, existing time slots may be extended where possible.

The list of time slot extensions and new candidate time slots are candidates to be offered to the receiving node in an in-band control Request message. The receiving node may also evaluate the interference constraints from its perspective of each of these candidates. Once this is done, it will select from the candidates those that also do not violate interference constraints in order to select a group that results in achieving the addition of the amount, New_Time_Increment, of time allocation per epoch. The list of selected changes are sent back to the transmit node in a Reply message. Once the Reply message is received, the transmit node may start using these changed time slot allocations.

Additional features of the invention may be found in a co-pending patent application filed concurrently herewith and assigned to the Assignee of the present invention entitled MOBILE AD-HOC NETWORK PROVIDING DESIRED LINK DELAY OFFSET WITHOUT GUARD TIMES AND RELATED METHODS, Ser. No. 12/125,128, the entire disclosure of which is hereby incorporated herein in its entirety by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile ad-hoc network (MANET) comprising:
a plurality of MANET nodes each comprising a wireless transceiver, a directional antenna coupled to said wireless transceiver, and a controller cooperating therewith and operable to
establish a directional wireless communication link with an adjacent MANET node based upon a time division multiple access (TDMA) implementation,
exchange position information with the adjacent MANET node to calculate range and direction information,
perform interference calculations based on the calculated range and direction information, the interference calculations including propagation delays between the adjacent MANET node and a pointing direction for the directional antenna,
the TDMA implementation using a repeating scheduling of a plurality of temporally spaced-apart time slot units within a fixed control epoch to thereby reduce a latency of communication, and using time slots and without using a range dependent guard time therein, and
determine a range to the adjacent MANET node, and to schedule time slots to offset a link delay in a received signal from the adjacent MANET node based upon the determined range.

2. The MANET of claim 1 wherein the plurality of time slot units are temporally equally spaced-apart within the control epoch.

3. The MANET of claim 1 wherein each time slot unit comprises a single time slot.

4. The MANET of claim 1 wherein each time slot unit comprises a plurality of time slots.

5. The MANET of claim 1 wherein the TDMA implementation comprises a distributed TDMA implementation wherein time slot scheduling operations are shared between said MANET nodes.

6. The MANET of claim 1 wherein the TDMA implementation comprises a variable-length time slot TDMA implementation.

7. The MANET of claim 1 wherein said controller further cooperates with at least one neighboring MANET node when scheduling time slots to reduce a likelihood of interference.

8. A mobile ad-hoc network (MANET) node comprising:
a wireless transceiver;
a directional antenna coupled to said wireless transceiver; and
a controller cooperating with said wireless transceiver and operable to
establish a directional wireless communication link with an adjacent MANET node in a MANET based upon a time division multiple access (TDMA) implementation,
exchange position information with the adjacent MANET node to calculate range and direction information,
perform interference calculations based on the calculated range and direction information, the interference calculations including propagation delays between the adjacent MANET node and a pointing direction for the directional antenna,
the TDMA implementation using a repeating scheduling of a plurality of temporally spaced-apart time slot units within a fixed control epoch to thereby reduce a latency of communication, and using time slots and without using a range dependent guard time therein, and determine a range to the adjacent MANET node, and to schedule time slots to offset a link delay in a received signal from the adjacent MANET node based upon the determined range.

9. The MANET node of claim 8 wherein the plurality of time slot units are temporally equally spaced-apart within the control epoch.

10. The MANET node of claim 8 wherein the TDMA implementation comprises a distributed TDMA implementation wherein time slot scheduling operations is shared with the adjacent MANET node.

11. The MANET node of claim 8 wherein the TDMA implementation comprises a variable-length time slot TDMA implementation.

12. A mobile ad-hoc network (MANET) communications method for a plurality of MANET nodes, the method comprising:

establishing a directional wireless communication link between a pair of adjacent MANET nodes based upon a time division multiple access (TDMA) implementation;

exchanging position information between the pair of adjacent MANET nodes for each MANET node to calculate range and direction information;

operating each MANET node to perform interference calculations based on the calculated range and direction information, the interference calculations including propagation delays between the adjacent MANET node and a pointing direction for a directional antenna associated therewith;

the TDMA implementation using a repeating scheduling of a plurality of temporally spaced-apart time slot units within a fixed control epoch to thereby reduce a latency of communication, and using time slots and without using a range dependent guard time therein; and determining a range to the adjacent MANET node, and scheduling time slots to offset a link delay in a received signal from the adjacent MANET node based upon the determined range.

13. The method of claim 12 wherein the plurality of time slot units are temporally equally spaced-apart within the control epoch.

14. The method of claim 12 wherein the TDMA implementation comprises a distributed TDMA implementation wherein time slot scheduling operations are shared between the MANET nodes.

15. The method of claim 12 wherein the TDMA implementation comprises a variable-length time slot TDMA implementation.

* * * * *